(12) United States Patent
Hurst et al.

(10) Patent No.: US 12,540,614 B2
(45) Date of Patent: Feb. 3, 2026

(54) VALVE MONITORING SYSTEM FOR A BELLOWS PUMP

(71) Applicant: Halliburton Energy Services, Inc., Houston, TX (US)

(72) Inventors: Justin Lee Hurst, Duncan, OK (US); Timothy Holiman Hunter, Duncan, OK (US); Andrew Silas Clyburn, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 59 days.

(21) Appl. No.: 18/398,905

(22) Filed: Dec. 28, 2023

(65) Prior Publication Data

US 2024/0376887 A1     Nov. 14, 2024

Related U.S. Application Data

(60) Provisional application No. 63/502,008, filed on May 12, 2023.

(51) Int. Cl.
    *F04B 51/00*     (2006.01)
    *E21B 43/12*     (2006.01)
    (Continued)

(52) U.S. Cl.
    CPC .............. *F04B 51/00* (2013.01); *E21B 43/12* (2013.01); *F04B 43/08* (2013.01); *F04B 49/065* (2013.01); *G01M 3/40* (2013.01)

(58) Field of Classification Search
    CPC ........ F04B 51/00; F04B 43/08; F04B 49/065; E21B 43/12; G01M 3/40
    See application file for complete search history.

(56) References Cited

U.S. PATENT DOCUMENTS

| | | |
|---|---|---|
| 1,256,127 A | 2/1918 | Gould |
| 1,301,485 A | 4/1919 | Mueller |
| | (Continued) | |

FOREIGN PATENT DOCUMENTS

| | | |
|---|---|---|
| CN | 201982789 U | 9/2011 |
| CN | 104763410 A | 7/2015 |
| | (Continued) | |

OTHER PUBLICATIONS

First Office Action dated Jun. 2, 2025 (44 pages), U.S. Appl. No. 18/399,058, filed Dec. 28, 2023.

(Continued)

*Primary Examiner* — Mary A Davis
(74) *Attorney, Agent, or Firm* — Conley Rose, P.C.; Rodney B. Carroll

(57) ABSTRACT

In a bellows pump, detecting any leakage of the valves and/or bellows can be important. Disclosed embodiments may relate to a bellows pump system configured to better monitor valve and/or bellows health. For example, the bellows pump can be configured with a power end, a fluid end, an expandable bellows in fluid communication with the power end, one or more strain gauge configured to measure strain in the pump, and a control system. In embodiments, the control system may monitor valve health based on strain gauge data. Disclosed embodiments may also include one or more position sensor and/or one or more pressure sensor, which may be used to evaluate valve and/or bellows health. Related methods and systems are also disclosed.

19 Claims, 13 Drawing Sheets

(51) Int. Cl.
*F04B 43/08* (2006.01)
*F04B 49/06* (2006.01)
*G01M 3/40* (2006.01)

(56) References Cited

U.S. PATENT DOCUMENTS

| | | | |
|---|---|---|---|
| 1,650,377 | A | 11/1927 | Nixon |
| 1,832,257 | A | 11/1931 | Stephens |
| 2,464,095 | A | 3/1949 | Nies |
| 2,546,302 | A | 3/1951 | Gehres et al. |
| 2,613,607 | A | 10/1952 | Sheen et al. |
| 2,735,369 | A | 2/1956 | Turvey |
| 2,807,215 | A | 9/1957 | Hawxhurst |
| 3,134,508 | A | 5/1964 | Bayer et al. |
| 3,151,562 | A | 10/1964 | Swartz |
| 3,192,860 | A | 7/1965 | Hardison |
| 3,338,170 | A | 8/1967 | Swartz |
| 3,411,452 | A | 11/1968 | Czarnecki et al. |
| 3,433,161 | A | 3/1969 | Vetter |
| 3,524,714 | A | 8/1970 | Grove et al. |
| 3,680,981 | A | 8/1972 | Wagner |
| RE29,055 | E | 11/1976 | Wagner |
| 4,003,679 | A | 1/1977 | McManigill |
| 4,080,107 | A | 3/1978 | Ferrentino |
| 4,406,595 | A | 9/1983 | Robertson et al. |
| 4,439,112 | A | 3/1984 | Kitsnik |
| 4,594,057 | A | 6/1986 | Morgan |
| 4,948,349 | A | 8/1990 | Koiwa |
| 5,220,943 | A | 6/1993 | Zink |
| 5,246,351 | A | 9/1993 | Horn et al. |
| 5,249,932 | A | 10/1993 | Van Bork |
| 5,308,230 | A | 5/1994 | Moore |
| 6,419,462 | B1 | 7/2002 | Horie et al. |
| 6,554,578 | B1 | 4/2003 | Siegel |
| 9,243,413 | B2 | 1/2016 | Robol et al. |
| 9,518,577 | B2 | 12/2016 | van Boeyen et al. |
| 10,408,204 | B2 | 9/2019 | Suzuki |
| 10,408,207 | B2 * | 9/2019 | Yamada ................ F04B 49/065 |
| 10,480,296 | B2 | 11/2019 | Beisel |
| 10,895,254 | B2 | 1/2021 | Beisel |
| 10,947,967 | B1 | 3/2021 | Surjaatmadja et al. |
| 11,125,225 | B2 | 9/2021 | Beisel |
| 11,268,502 | B2 | 3/2022 | Mollatt |
| 11,286,920 | B2 | 3/2022 | Mollatt |
| 11,346,336 | B2 | 5/2022 | Surjaatmadja et al. |
| 11,401,792 | B2 | 8/2022 | Mollatt |
| 11,415,123 | B2 | 8/2022 | Hunter et al. |
| 2003/0031565 | A1 | 2/2003 | Kleibrink |
| 2006/0008364 | A1 | 1/2006 | Traylor |
| 2007/0065305 | A1 | 3/2007 | Budde et al. |
| 2007/0074872 | A1 | 4/2007 | Du et al. |
| 2008/0145248 | A1 | 6/2008 | Kato et al. |
| 2009/0041588 | A1 | 2/2009 | Hunter et al. |
| 2012/0091165 | A1 | 4/2012 | Cedrone et al. |
| 2012/0308409 | A1 | 12/2012 | Levine |
| 2015/0148919 | A1 | 5/2015 | Watson |
| 2016/0097384 | A1 | 4/2016 | Menjoh et al. |
| 2016/0123313 | A1 | 5/2016 | Simmons |
| 2018/0313196 | A1 | 11/2018 | Frantz, III et al. |
| 2019/0383279 | A1 * | 12/2019 | Simmons ............. F04B 49/065 |
| 2020/0217186 | A1 | 7/2020 | Mollatt |
| 2020/0256333 | A1 | 8/2020 | Surjaatmadja et al. |
| 2020/0277951 | A1 | 9/2020 | Hunter et al. |
| 2020/0309113 | A1 | 10/2020 | Hunter et al. |
| 2021/0140294 | A1 | 5/2021 | Mollatt |
| 2021/0148354 | A1 | 5/2021 | Adams |
| 2021/0173111 | A1 | 6/2021 | Therrien et al. |
| 2021/0190065 | A1 | 6/2021 | Ferden et al. |
| 2021/0246894 | A1 | 8/2021 | Mollatt |
| 2022/0178368 | A1 | 6/2022 | Montilla Jimenez et al. |
| 2024/0376809 | A1 * | 11/2024 | Hurst .................. E21B 43/129 |
| 2024/0376881 | A1 | 11/2024 | Hurst et al. |
| 2025/0163784 | A1 * | 5/2025 | Clyburn ................ E21B 43/121 |

FOREIGN PATENT DOCUMENTS

| | | | | |
|---|---|---|---|---|
| CN | 106761573 | B | 4/2019 | |
| DE | 596227 | C | 7/1934 | |
| DE | 2253288 | A1 | 5/1974 | |
| DE | 3706338 | A1 | 9/1988 | |
| EP | 1602830 | A1 | 7/2005 | |
| EP | 2913525 | A1 | 2/2015 | |
| EP | 4286688 | A1 * | 12/2023 | ............. F04B 43/08 |
| FR | 1441747 | A | 6/1966 | |
| FR | 2367203 | A2 | 5/1978 | |
| GB | 2185291 | A | 7/1987 | |
| JP | H11159464 | A | 6/1999 | |
| JP | 2006200464 | B2 | 8/2006 | |
| JP | 2007100663 | A | 4/2007 | |
| KR | 1020170016059 | A | 8/2018 | |
| SU | 1359482 | A1 | 12/1987 | |
| WO | 2015078487 | A1 | 6/2015 | |
| WO | 2022099219 | A1 | 5/2022 | |
| WO | 2022164034 | A1 | 8/2022 | |

OTHER PUBLICATIONS

First Office Action dated Apr. 28, 2025 (45 pages), U.S. Appl. No. 18/398,878, filed Dec. 28, 2023.

Filing Receipt, Specification and Drawings for U.S. Appl. No. 18/398,858, filed Dec. 28, 2023, entitled "Bellows Failure Detection for a Pump," 70 pages.

Filing Receipt, Specification and Drawings for U.S. Appl. No. 18/398,878, filed Dec. 28, 2023, entitled "Direct Connect Piston-Driven Bellows Pump," 96 pages.

Filing Receipt, Specification and Drawings for U.S. Appl. No. 18/398,885, filed Dec. 28, 2023, entitled "Improved Cooling for Bellows Pump," 80 pages.

Filing Receipt, Specification and Drawings for U.S. Appl. No. 18/398,923, filed Dec. 28, 2023, entitled "Active Bellows Pump Valve Management," 81 pages.

Filing Receipt, Specification and Drawings for U.S. Appl. No. 18/399,058, filed Dec. 28, 2023, entitled Protection of Make-Up System for High Pressure Bellows-Stylepump System, 91 pages.

Foreign Communication from Related Application—International Search Report and Written Opinion of the International Searching Authority, International Application No. PCT/US2023/086392, dated Apr. 19, 2024, 11 pages.

Filing Receipt, Specification and Drawings for U.S. Appl. No. 18/398,936, filed Dec. 28, 2023, entitled "Systems and Methods Using a Bellows Pump to Perform Operations for a Subterranean Formation," 81 pages.

First Office Action dated Mar. 12, 2025 (8 pages), U.S. Appl. No. 18/398,936, filed Dec. 28, 2023.

Foreign Communication from Related Application—International Search Report and Written Opinion of the International Searching Authority, International Application No. PCT/US2023/086404, dated Apr. 24, 2024, 10 pages.

Foreign Communication from Related Application—International Search Report and Written Opinion of the International Searching Authority, International Application No. PCT/US2023/086394, dated Apr. 24, 2024, 11 pages.

Foreign Communication from Related Application—International Search Report and Written Opinion of the International Searching Authority, International Application No. PCT/US2023/086395, dated Apr. 30, 2024, 11 pages.

Foreign Communication from Related Application—International Search Report and Written Opinion of the International Searching Authority, International Application No. PCT/US2023/086389, dated May 1, 2024, 11 pages.

Foreign Communication from Related Application—International Search Report and Written Opinion of the International Searching Authority, International Application No. PCT/US2023/086385, dated May 7, 2024, 11 pages.

Foreign Communication from Related Application—International Search Report and Written Opinion of the International Searching Authority, International Application No. PCT/US2023/086397, dated May 7, 2024, 10 pages.

(56) References Cited

OTHER PUBLICATIONS

First Office Action dated Jun. 23, 2025 (47 pages), U.S. Appl. No. 18/399,058, filed Dec. 28, 2023.
First Office Action dated May 2, 2025 (28 pages), U.S. Appl. No. 18/398,923, filed Dec. 28, 2023.

* cited by examiner

VALVE MONITORING SYSTEM FOR A BELLOWS PUMP

CROSS-REFERENCE TO RELATED APPLICATIONS

This application claims priority benefit under 35 U.S.C. 119(e) of U.S. Provisional Patent Application Ser. No. 63/502,008 (filed May 12, 2023), which is incorporated by reference herein in its entirety.

STATEMENT REGARDING FEDERALLY SPONSORED RESEARCH OR DEVELOPMENT

Not applicable.

FIELD

This disclosure relates generally to the field of pumping, for example pumping of fluids downhole in a well. More particularly, this disclosure relates to systems and methods relating to bellows pumps.

BACKGROUND

To produce hydrocarbons (for example, oil, gas, etc.) from a subterranean formation, wellbores may be drilled that penetrate hydrocarbon-containing portions of the subterranean formation. The portion of the subterranean formation from which hydrocarbons may be produced is commonly referred to as a "production zone." In some instances, a subterranean formation penetrated by the wellbore may have multiple production zones at various locations along the wellbore.

Generally, after a wellbore has been drilled to a desired depth, completion operations are performed. Such completion operations may include inserting a liner or casing into the wellbore and, at times, cementing the casing or liner into place. Once the wellbore is completed as desired (lined, cased, open hole, or any other known completion), treatment, such as a stimulation operation, may be performed to enhance hydrocarbon production into the wellbore. Examples of some common stimulation operations involve hydraulic fracturing, acidizing, fracture acidizing, and hydro-jetting. Stimulation operations are intended to increase the flow of hydrocarbons from the subterranean formation surrounding the wellbore into the wellbore itself so that the hydrocarbons may then be produced up to the wellhead.

One typical formation stimulation process may involve hydraulic fracturing of the formation and placement of a proppant in those fractures. Typically, a treatment/stimulation fluid (which may comprise a clean fluid and a proppant) may be mixed at the surface before being pumped downhole in order to induce fractures or perforations in the formation of interest. The creation of such fractures or perforations will increase the production of hydrocarbons by increasing the flow paths into the wellbore.

Various types of pumps have been used in well operations such as hydraulic fracturing. However, given the difficult conditions and related wear and reliability issues that may arise when pumping treatment fluids for a hydrocarbon well, there is need for improved pumps and related systems and methods.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
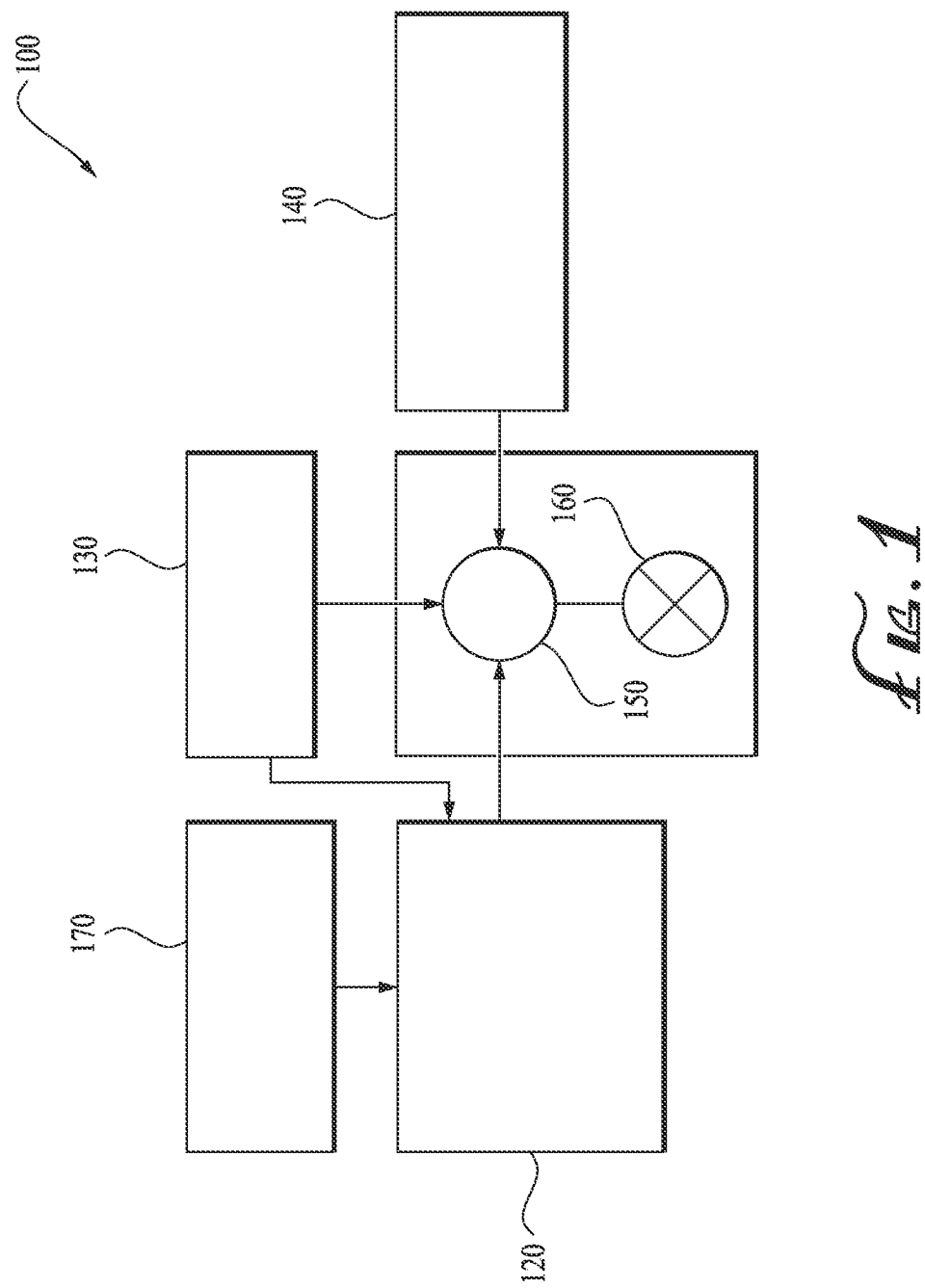
FIG. 1 is a schematic illustration of an exemplary well treatment system, such as an exemplary fracturing system, according to an embodiment of the disclosure.

It should be understood at the outset that although illustrative implementations of one or more embodiments are illustrated below, the disclosed systems and methods may be implemented using any number of techniques, whether currently known or not yet in existence. The description that follows includes example systems, methods, techniques, and program flows that embody aspects of the disclosure. However, it is understood that this disclosure may be practiced without these specific details. For brevity, well-known steps, protocols, structures, and techniques have not been shown in detail in order not to obfuscate the description. The disclosure should in no way be limited to the illustrative implementations, drawings, and techniques illustrated below, but may be modified within the scope of the appended claims along with their full scope of equivalents.

As used herein the terms "uphole", "upwell", "above", "top", and the like refer directionally in a wellbore towards the surface, while the terms "downhole", "downwell", "below", "bottom", and the like refer directionally in a wellbore towards the toe of the wellbore (e.g. the end of the wellbore distally away from the surface), as persons of skill will understand. Orientation terms "upstream" and "downstream" are defined relative to the direction of flow of fluid. "Upstream" is directed counter to the direction of flow of fluid, while "downstream" is directed in the direction of flow of fluid, as persons of skill will understand.

Disclosed embodiments illustrate exemplary devices, systems, and methods for using treatment fluids to carry out subterranean treatments in conjunction with a variety of subterranean operations, including but not limited to, hydraulic fracturing operations, fracturing acidizing operations to be followed with proppant hydraulic fracturing operations, stimulation treatments, drilling, cementing, and the like. For example, treatment fluid may be introduced into a wellbore (e.g. which penetrates a subterranean formation) at a pressure sufficient to create or enhance one or more fractures within the subterranean formation (for example, hydraulic fracturing) and/or to create or enhance and treat microfractures within a subterranean formation in fluid communication with a primary fracture in the formation. In one or more embodiments, the systems and methods of the present disclosure may be used to treat pre-existing fractures, or fractures created using a different treatment fluid. In one or more embodiment, a treatment fluid may be introduced at a pressure sufficient to create or enhance one or more fractures within the formation, and/or one or more of the treatment fluids may include a proppant material which subsequently may be introduced into the formation. In embodiments, treatment fluid can be any fluid (and may in some instances include solid particles therein) which can be pumped into a well. In embodiments, treatment fluid may differ from drive fluid used within a pump mechanism.

By way of example, FIG. 1 schematically illustrates an exemplary fracturing system 100. The fracturing system 100 may be implemented using the systems, methods, and techniques described herein. In particular, the disclosed systems, methods, and techniques may directly or indirectly affect one or more components or pieces of equipment associated with the example fracturing system 100, according to one or more embodiments. In embodiments, the fracturing system 100 may comprise one or more of the following: a fracturing fluid producing apparatus 120, a fluid source 130, a solid source 140, an additive source 170, and a pump and blender system 150. All or an applicable combination of these components of the fracturing system 100 may reside at the surface at a well site/fracturing pad where a well 160 can be located.

During a fracturing job, the fracturing fluid producing apparatus 120 may access the fluid source 130 for introducing/controlling flow of a fluid, e.g. a treatment fluid such as fracturing fluid, in the fracturing system 10. While only a single fluid source 130 is shown, the fluid source 130 may include a plurality of separate fluid sources (e.g. storage tanks). In some embodiments, the fracturing fluid producing apparatus 120 may be omitted from the fracturing system 100, with the fracturing fluid instead being sourced directly from the fluid source 130 during a fracturing job rather than through the intermediary fracturing fluid producing apparatus 120.

The fracturing fluid may be an applicable fluid for forming fractures during a fracture stimulation treatment of the well 160. For example, the fracturing fluid may include water, a hydrocarbon fluid, a polymer gel, foam, air, wet gases, and/or other applicable fluids. In various embodiments, the fracturing fluid may include a concentrate to which additional fluid is added prior to use in a fracture stimulation of the well 160. In certain embodiments, the fracturing fluid may include a gel pre-cursor with fluid, e.g. liquid or substantially liquid, from fluid source 130. Accordingly, the gel pre-cursor with fluid may be mixed by the fracturing fluid producing apparatus 120 to produce a hydrated fracturing fluid for forming fractures.

The solid source 140 may include a volume of one or more solids which may be mixed with a fluid, e.g. the fracturing fluid, to form a solid-laden fluid. The solid-laden fluid may be pumped into the well 160 as part of a solid-laden fluid stream that is used to form and stabilize fractures in the well 160 during a fracturing job. The one or more solids within the solid source 140 may include applicable solids that may be added to the fracturing fluid of the fluid source 130. Specifically, the solid source 140 may contain one or more proppants for stabilizing fractures after they are formed during a fracturing job, e.g. after the fracturing fluid flows out of the formed fractures. For example, the solid source 140 may contain sand.

The fracturing system 100 may also include an additive source 170. The additive source 170 may contain/provide one or more applicable additives that may be mixed into fluid, e.g. the fracturing fluid, during a fracturing job. For example, the additive source 170 may include solid-suspension-assistance agents, gelling agents, weighting agents, and/or other optional additives to alter the properties of the fracturing fluid. The additives may be included in the fracturing fluid to reduce pumping friction, to reduce or eliminate the fluid's reaction to the geological formation in which the well is formed, to operate as surfactants, and/or to serve other applicable functions during a fracturing job. As will be discussed in greater detail later, the additives may function to maintain solid particle suspension in a mixture of solid particles and fracturing fluid as the mixture is pumped down the well 160 to one or more perforations.

The pump and blender system 150 functions to pump treatment fluid into the well 160. Specifically, the pump and blender system 150 of FIG. 1 may pump fracture fluid from the fluid source 130, e.g. fracture fluid that is received through the fracturing fluid producing apparatus 120, into the well 160 for forming and potentially stabilizing fractures as part of a fracture job. The pump and blender system 150 may include one or more pumps. Specifically, the pump and blender system 150 may include a plurality of pumps that may operate together, e.g. concurrently, to form fractures in a subterranean formation as part of a fracturing job. The one or more pumps included in the pump and blender system 150 may be any applicable type of fluid pump. For example, the pumps in the pump and blender system 150 may include electric pumps and/or hydrocarbon and hydrocarbon mixture powered pumps, such as diesel-powered pumps, natural gas-powered pumps, and diesel combined with natural gas-powered pumps. In one or more embodiments, one or more of the pumps in the pump and blender system 150 may be a bellows pump.

In some embodiments, the pump and blender system 150 may also function to receive the fracturing fluid and combine it with other components and solids (e.g. with the pump and blender system 150 optionally comprising a blender unit). Specifically, the pump and blender system 150 may combine the fracturing fluid with volumes of solid particles, e.g. proppant, from the solid source 140 and/or additional fluid and solids from the additive source 170. In turn, the pump and blender system 150 may pump the resulting mixture down the well 160 at a sufficient pumping rate to create or enhance one or more fractures in a subterranean zone, for example, to stimulate production of fluids from the zone. While the pump and blender system 150 is described to perform both pumping and mixing of fluids and/or solid particles, in various embodiments, the pump and blender system 150 may function to just pump a fluid stream, e.g. a treatment and/or fracture fluid stream, down the well 160 to create or enhance one or more fractures in a subterranean zone. In some embodiments, a separate pump and/or separate blender may be used (e.g. independently of each other or alone).

In embodiments, one or more elements/components of the system may be monitored (e.g. using one or more sensor). For example, the fracturing fluid producing apparatus 120, fluid source 130, and/or solid source 140 may be equipped with one or more monitoring devices (not shown). The monitoring devices may be used to control the flow of fluids, solids, and/or other compositions to the pumping and blender system 150. Such monitoring devices may effectively allow the pumping and blender system 150 to source from one, some, or all of the different sources at a given time. In turn, the pumping and blender system 150 may provide just fracturing fluid into the well 160 at some times, just solids or solid slurries at other times, and combinations of those components at other times.

Figure 2:
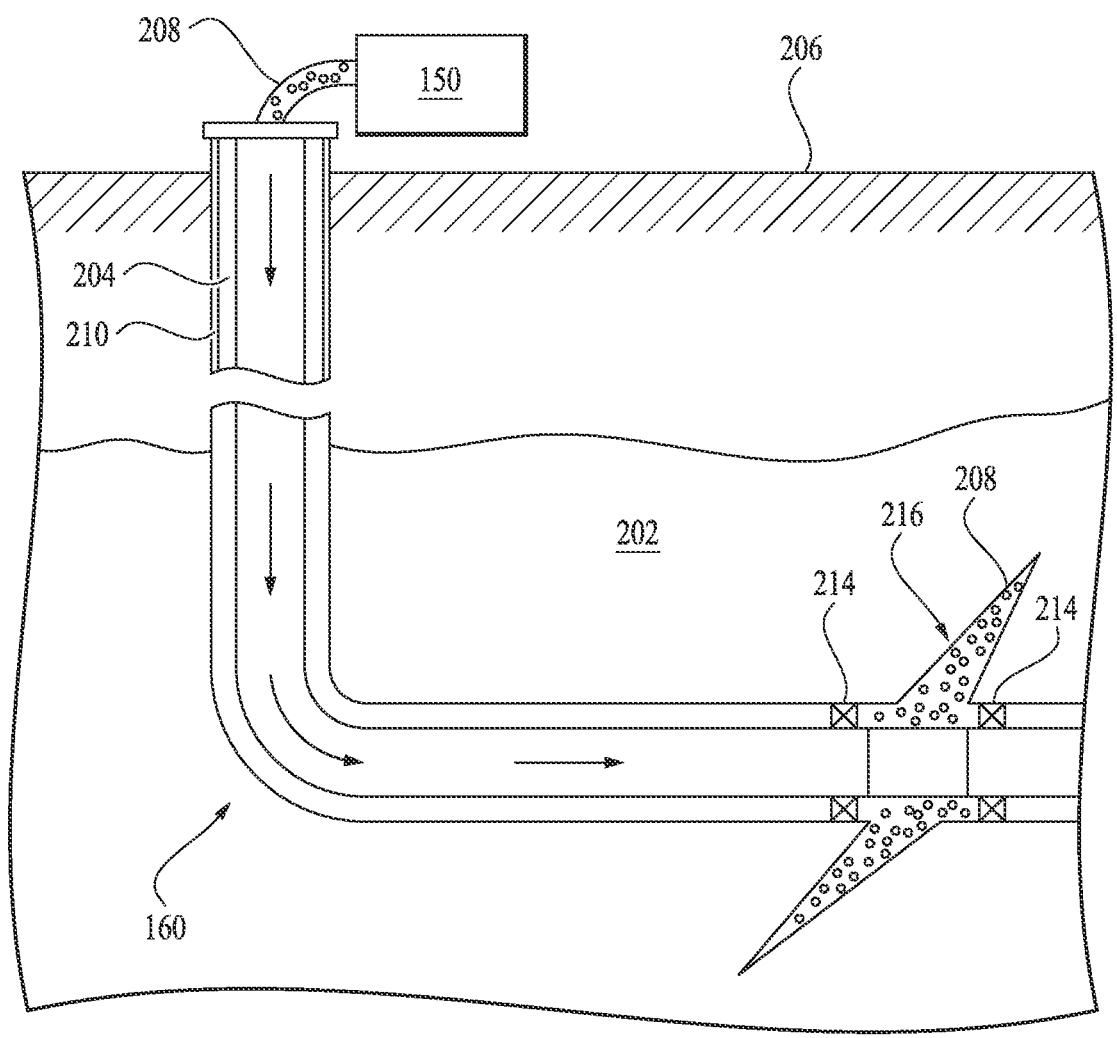
FIG. 2 is a schematic illustration of an exemplary well during a treatment operation, according to an embodiment of the disclosure.

FIG. 2 illustrates an exemplary well 160 during a treatment operation (e.g. a fracturing operation) in a portion of a subterranean formation of interest 202 surrounding a wellbore 204. In embodiments, the downhole operation may be performed using one or an applicable combination of the components in the example system 100 shown in FIG. 1. The wellbore 204 of FIG. 2 extends from a surface 206, and a fracturing fluid 208 is applied to a portion of the subterranean formation 202 (e.g. surrounding the horizontal portion of the wellbore 204). Although shown as vertical deviating to horizontal, the wellbore 204 may include horizontal, vertical, slant, curved, and other types of wellbore geometries and orientations, and the fracturing treatment may be applied to a subterranean zone surrounding any portion of the wellbore 204. The wellbore 204 may include a casing 210 that is cemented or otherwise secured to the wellbore wall. The wellbore 204 may be uncased or otherwise include uncased sections. Perforations may be formed in the casing 210 to allow fracturing fluids and/or other materials to flow into the subterranean formation 202. In the example fracture operation shown in FIG. 2, a perforation is created between points 214 (which may represent one or more packer element in some embodiments) defining an isolated zone.

The pump and blender system 150 (or in some embodiments, just a pump or a separate pump and a separate blender) may be fluidly coupled to the wellbore 204 to pump treatment fluid (e.g. fracturing fluid 208), and potentially other applicable solids and solutions, into the wellbore 204. When the fracturing fluid 208 is introduced into wellbore 204, it may flow through at least a portion of the wellbore 204 to the perforation, for example defined by points 214 in FIG. 2. The fracturing fluid 208 may be pumped at a sufficient pumping rate through at least a portion of the wellbore 204 to create one or more fractures 216 through the perforation and into the subterranean formation 202. Specifically, the fracturing fluid 208 may be pumped at a sufficient pumping rate to create a sufficient hydraulic pressure at the perforation to form the one or more fractures 216. Further, solid particles, e.g. proppant from the solid source 140, may be pumped into the wellbore 204, e.g. within the fracturing fluid 208 towards the perforation. In turn, the solid particles may enter the fractures 216 where they may remain after the fracturing fluid flows out of the wellbore. These solid particles may stabilize or otherwise "prop" the fractures 216, such that fluids may flow freely through the fractures 216.

While only two perforations at opposing sides of the wellbore 204 are shown in FIG. 2, greater than two perforations may be formed in the wellbore 204 as part of a perforation cluster. Fractures may then be formed through the plurality of perforations in the perforation cluster as part of a fracturing stage for the perforation cluster. Specifically, fracturing fluid and solid particles may be pumped into the wellbore 204 and pass through the plurality of perforations during the fracturing stage to form and stabilize the fractures through the plurality of perforations.

The pump and blender system 150 may comprise a pump, which may be used, either alone or in combination with one or more other pumps, to pressurize a treatment fluid and/or introduce the treatment fluid into wellbore 204 penetrating at least a portion of a subterranean formation to perform a treatment therein. For example, in hydraulic fracturing operations, one or more pumps may be used to pump a treatment fluid (e.g. fracturing fluid 208, which typically may be a slurry mixture of proppant and/or sand mixed with water) into the formation.

In some embodiments, the pump may comprise a bellows pump 300, which may be configured to segregate treatment fluid from drive fluid (sometimes termed power fluid). See for example FIG. 3, which schematically illustrates a bellows pump 300. The bellows pump 300 may comprise a power end 310, a fluid end 320, and an expandable bellows 330. The fluid end 320 may have a chamber 321 within a fluid end housing 323, a suction valve 326 in fluid communication with (e.g. fluidly coupled to) the chamber 321 and a source/reservoir for the treatment fluid 350 (e.g. with the suction valve 326 being configured to allow for insertion of treatment fluid into the chamber 321), and a discharge valve 328 in fluid communication with (e.g. fluidly coupled to) the chamber 321 and the well (e.g. with the discharge valve 328 being configured to allow for insertion of treatment fluid from the chamber 321 into the well or any other place where treatment fluid is intended to be pumped). While the suction valve 326 and discharge valve 328 may be disposed within the housing 323 for the fluid end 320 in some embodiments, in other embodiments, the suction valve 326 and discharge valve 328 may be located within other components (such as piping) that fluidly couples the valves to the elements/components of the pump 300 as described.

In embodiment, the power end 310 may be fluidly connected to (e.g. in fluid communication with) the bellows 330 (e.g. the inner volume of the bellows) and/or configured to reciprocally expand/inflate and contract/deflate the bellows 330 based on movement of drive fluid 311 (sometimes termed power fluid). The bellows 330 may be configured to reciprocally expand and/or retract within the chamber 321 of the fluid end 320 based on movement of the drive fluid 311. In some embodiments, the bellows 330 may be sealingly coupled to an opening in the chamber 321 of the fluid end 320 (e.g. coupled to the wall of the chamber), so that fluid communication between the power end 310 and the bellows 330 causes reciprocal movement of the bellows 330 within the chamber 321. In some embodiments, the power end 310 may be (e.g. sealingly) coupled to the fluid end 320, with no flow of treatment fluid or drive fluid therebetween (e.g. since the bellows 330 separates the fluids).

In embodiments, the bellows 330 may comprise a flexible/expandable bag or body, typically of thin, flexible material, whose inner volume (e.g. the open space therein, which may be configured to hold drive fluid) can be changed (e.g. based on the amount/pressure of fluid therein). The bellows 330 may have an opening allowing fluid communication of drive fluid 311 with the power end 310, but in some embodiments may otherwise have a form configured to retain fluid therein. For example, the bellows 330 may be configured to prevent fluid transfer between its interior and the chamber 321 of the fluid end 320 external to the bellows 330. In some embodiments, the bellows 330 may comprise an elastomeric element and/or material. In some embodiments, the bellows 330 may comprise metal material and/or may include an accordion-like configuration (e.g. having pleats or folds or convolutions). In some embodiments, exemplary metal bellows may be formed of a metal that is sufficiently flexible and/or durable and configured appropriately to effectively withstand repeated back and forth motion due to reciprocal movement without breaking or wearing to failure for a reasonable life of the bellows. For example, the bellows may comprise stainless steel, nickel alloys such as Inconel & Monel, hastealloy, and/or copper alloys. In some embodiments, the bellows 330 may not be configured to withstand significant pressure differentials. In some embodiments, the bellows 330 may be configured to separate (e.g. isolate) drive fluid 311 (e.g. clean fluid) from treatment fluid (e.g. dirty fluid, such as fluid having proppant, abrasives, and/or corrosive materials, such as from treatment fluid source 350).

The bellows 330 may be disposed in and/or configured to expand into the chamber 321 of the fluid end 320, and may be configured to serve as a separating barrier that divides the chamber 321 into a first volume 373 within the bellows 330 and a second volume 375 outside of the bellows 330. The first volume 373 (e.g. inner volume of the bellows 330) may be in fluid communication with the power end 310, and may in some embodiments contain drive fluid. The second volume 375 of the chamber 321 is in fluid communication with the suction valve 326 and discharge valve 328, and is configured for treatment fluid to flow therethrough. The bellows 330 may serve as a fluid separating barrier between the drive fluid 311 in the first volume 373 and the treatment fluid in the second volume 375. The bellows 330 may be configured to flex (e.g. expand and/or contract) to balance pressure between the first volume 373 and second volume 375 during operation of the pump 300. In some embodiments, the bellows 330 may be configured to flex axially. The power end 310 of pump 300 may be sealingly connected to the fluid end 320, to prevent entry of treatment fluid from the fluid end 320 into the power end 310.

The chamber 321 may be downstream of the fluid treatment source 350 and upstream of the well 160. Typically, the suction valve 326 can be a one-way check valve configured to allow treatment fluid from the treatment fluid source 350 to enter the chamber 321 (e.g. during a suction stroke of the pump 300), and the discharge valve 328 can be a one-way check valve configured to allow treatment fluid to exit the chamber 321 towards the well (e.g. during a power/discharge stroke of the pump 300). The reciprocating expansion and retraction of the bellows 330 in the chamber 321 (e.g. with the bellows 330 expanding/inflating for the discharge stroke and contracting/deflating for the suction stroke) can be configured to work in conjunction with the suction valve 326 and discharge valve 328 to allow the fluid end 320 to pump treatment fluid into the well 160. For example, during a discharge stroke, as drive fluid 311 enters the first volume 373 (e.g. the inner volume of the bellows 330), the bellows 330 inflates and treatment fluid is expelled from the second volume 375 of the chamber 321 through the discharge valve 328. Once the discharge stroke is complete, a suction stroke can begin. During the suction stroke, drive fluid 311 inside the first volume 373 exits the bellows 330, the bellows 330 deflates, and treatment fluid can be drawn through the suction valve 326 into the second volume 375 of the chamber 321. Once the bellows 330 is compressed to its minimum desired/permitted length, another discharge stroke can begin.

The bellows 330 may be configured to separate treatment fluid, which the pump 300 may be pumping into the well 160, from drive fluid 311 used for pump operations. By way of example, the drive fluid 311 may be chosen from a desirable group of liquids, which may include hydraulic fluid such as water or hydraulic oil. In some embodiments, the drive fluid 311 may also serve as a lubricant for the pump 300, for example forming a barrier against wear due to friction. In the case of a fracturing operation or a fracturing pump, the treatment fluid may be a fracturing fluid that may comprise a base fluid (e.g., water, oils, organic liquids, etc.) as well as any other suitable components or additives useful for the fracturing treatment. For example, the fracturing fluid may be a slurry containing sand or synthetic proppants and/or a variety of chemical additives such as gelling agents, acids, friction reducers, and solvents.

In various embodiments, any mechanism for causing reciprocal movement of the bellows 330 (e.g. by movement of the drive fluid 311) can provide the pumping action for the pump 300. In some embodiments, the power end 310 may further comprise a piston or plunger 410 configured to reciprocally move drive fluid 311 (e.g. in and out of the bellows 330). See for example FIG. 4, which schematically illustrates an embodiment of the bellows pump 300 having a piston/plunger 410. Reciprocal movement (e.g. axial translation) of the piston/plunger 410 within a bore 420 of the power end housing 413 may cause the reciprocal movement (e.g. expanding and contracting) of the bellows 330 (e.g. within the chamber 321 of the fluid end 320), for example with the piston/plunger 410 displacing fluid (e.g. hydraulic drive fluid 311) which is located in the bore 420 between the driven end of the piston/plunger 410 (e.g. the end in proximity to the bellows 330) and the bellows 330. Since the bore 420 is fluidly coupled to (e.g. in fluid communication with) the bellows 330, the piston/plunger 410 reciprocally displacing drive fluid 311 can induce reciprocal movement (e.g. expansion and contraction) of the bellows 330. As used herein, reference to "piston" shall include both conventional piston and plunger elements for convenience of reference.

Figure 4:
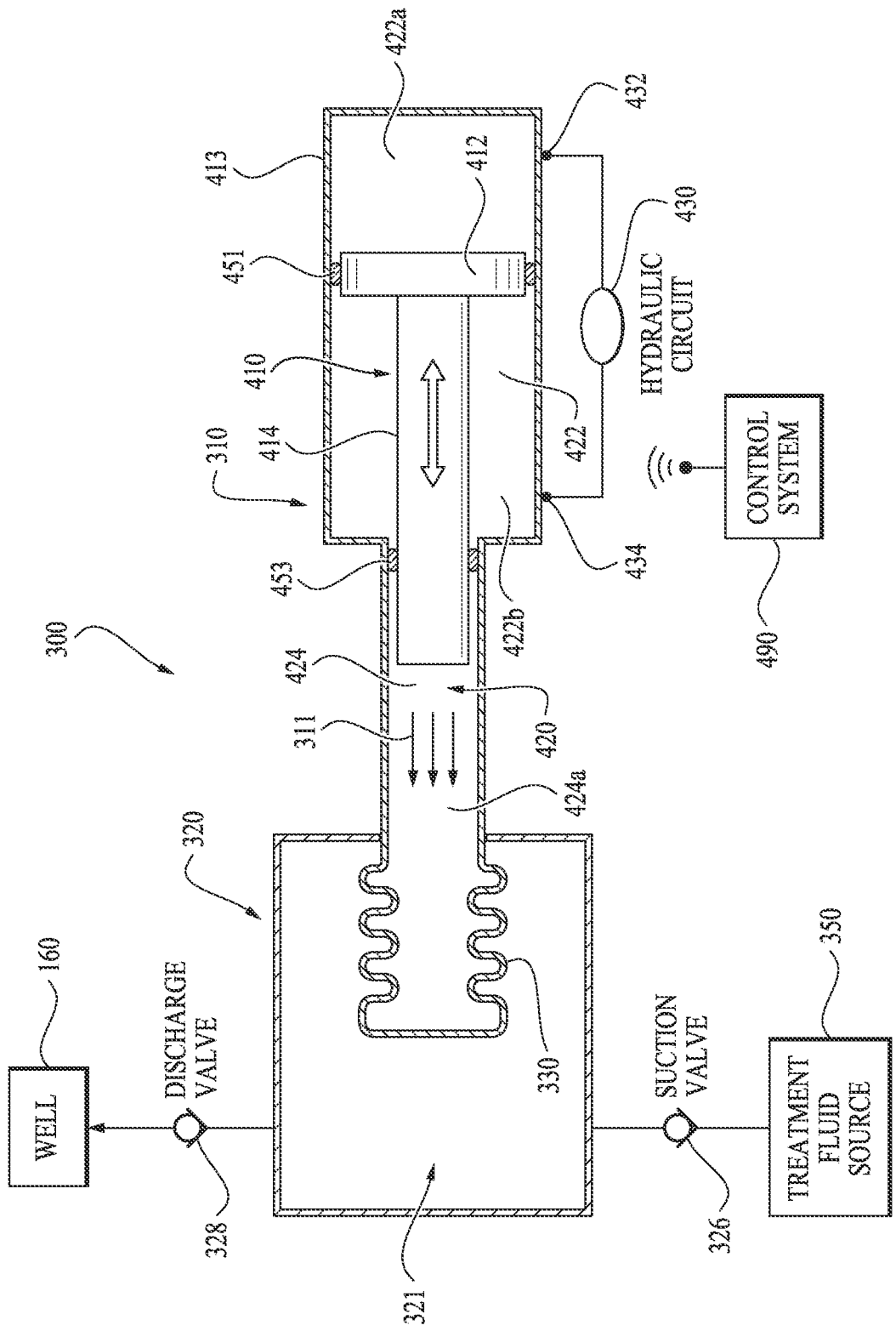
FIG. 4 is a schematic illustration of an exemplary bellows pump with piston/plunger, according to an embodiment of the disclosure.

In embodiments, the piston 410 may be configured to sealingly move within the bore 420, for example having one or more seal (configured to engage between the piston 410 and the bore 420) disposed on the piston 410 and/or on the inner wall of the bore 420. In some embodiments, one or more seal may comprise pump packing. In some embodiments, the bellows 330 may be configured to protect the piston 410 from wear, for example by separating the piston 410 from the treatment fluid in the fluid end 320. In some embodiments, the piston 410 may be configured so that, during its reciprocal movement in the bore 420, the piston 410 does not extend into the inner volume of the bellows 330; while in other embodiments, the piston 410 may be configured to extend partially into the bellows during a discharge stroke. Regardless, the piston 410 may be configured to not contact the bellows 330 (e.g. the end of the bellows) during its reciprocal movement. The piston 410 can be driven/powered by any suitable means, including various types of driver elements configured to induce reciprocal movement of the piston 410, such as a hydraulic circuit, a combustion engine, an electric motor, a linear actuator, rack and pinion, etc. In the example of FIG. 4, the piston 410 may be driven by a hydraulic circuit 430. In other exemplary embodiments, the pump 300 may be powered by natural gas (e.g. via a natural gas-fired engine or natural gas-fired electric generator) produced from the same area in which well treatment (e.g. fracturing) operations are being performed. In some embodiments, a control system 490 may control one or more aspect of the driver (e.g. to control the reciprocation of the piston 410 and thereby the bellows 330) and/or the valves (e.g. 326, 328).

In some embodiments, the piston 410 can comprise a head 412 and a rod 414 (e.g. with the rod 414 disposed between the head 412 and the bellows 330, and extending from the head 412 towards the fluid end 320). In some embodiments, the piston 410 can be driven by a hydraulic circuit 430. For example, the hydraulic circuit 430 of the power end 310 can include a first port 432, located such that the head 412 is disposed between the first port 432 and the rod 414, and a second port 434 located between the head 412 and the bellows 330 (e.g. more proximate the bellows 330 than the first port 432). In some embodiments, the hydraulic circuit 430 may include one or more source of drive fluid and/or one or more pump. For example, the first port 432 may be in fluid communication with a source of drive fluid and/or a pumping mechanism. In some embodiments, the second port 434 may be in fluid communication with a source of drive fluid and/or a pumping mechanism. In some embodiments, the source of drive fluid may be the same for the first port 432 and the second port 434. In some embodiments, the pumping mechanism may be the same for the first port 432 and the second port 434. In some embodiments, the hydraulic circuit 430 may include one or more valve. The hydraulic circuit 430 may be configured to produce pressure differential on either side of the piston 410 (e.g. the head 412), for example by introducing drive fluid (such as hydraulic oil) via the ports (432, 434), which may induce movement/displacement of the piston 410. For example, introducing drive fluid via the first port 432 and/or removing drive fluid via the second port 434 may urge extension of the piston 410 towards the fluid end 320, while introducing drive fluid via the second port 434 and/or removing drive fluid via the first port 432 may retract the piston 410, urging the piston 410 away from the fluid end 320.

While the rod 414 and head 412 may have a similar diameter in some embodiments, in some embodiments the rod 414 may have a smaller diameter than the head 412. The ratio of size differential between the rod 414 and the head 412 can provide an intensifying effect, in which pressure applied to the head 412 is multiplied/increased as applied to the bellows 330 (via the rod 414). For example, the piston 410 may be part of an intensifier configured to intensify applied pressure (e.g. from the driver) to the bellows 330 (e.g. with the rod 414 having a smaller diameter than the head 412). For example, the size difference/ratio between the diameter of the rod 414 and the head 412 may range from approximately 1:1.1 to 1:10 (e.g. from 1:1.5 to 1:10, from 1:2 to 1:10, from 1:3 to 1:10, from 1:5 to 1:10, from 1:7 to 1:10, from 1:1.5 to 1:8, from 1:1.5 to 1:5, from 1:1.5 to 1:3, from 1:2 to 1:8, from 1:2 to 1:5, from 1:2 to 1:3, from 1:3 to 1:10, from 1:3 to 1:8, or from 1:3 to 1:5).

As described above, the power end 310 may include a bore 420 (e.g. in a power end housing 413) in fluid communication with (e.g. fluidly coupled to) the bellows 330 (e.g. an internal volume of the bellows), and the piston 410 can be disposed within the bore 420. In embodiments (e.g. in which the piston 410 is not uniform in diameter along its length), the bore 420 may have a first portion 422 with an inner diameter configured for movement of the head 412 (axially) therethrough and a second portion 424 with an inner diameter configured for movement of the rod 414 (axially) therethrough. For example, the first portion 422 of the bore may have a diameter approximately equal to that of the head 412, while the second portion 424 of the bore may have a diameter approximately equal to that of the rod 414 (e.g. the first portion 422 of the bore may have a larger diameter than the second portion 424 of the bore). In embodiments, the head 412 may separate the first portion 422 of the bore 420 into two cavities (whose volumes may change based on the position of the head 412 within the bore 420), for example with a first cavity 422a distally away from the fluid end 320 and/or bellows 330 (e.g. with the head 412 disposed between the first cavity 422a and the bellows 330) and a second cavity 422b more proximal to the bellows 330 and/or fluid end 320 (e.g. with the second cavity 422b disposed between the head 412 and the bellows 330). Interaction of the rod 414 within the second portion 424 of the bore 420 may form a third cavity 424a in fluid communication with the bellows 330. In embodiments having a hydraulic circuit as the driver (e.g. as shown in FIG. 4), the first port 432 may be in fluid communication with the first cavity 422a, and the second port 434 may be in fluid communication with the second cavity 422b. The third cavity 424a may be in fluid communication with the bellows 330. Typically, the bore 420 may extend along the longitudinal axis of the power end 310 and/or parallel to the longitudinal axis (e.g. the axis of extension) of the bellows 330.

In operation, the head 412 of the piston 410 may be configured to sealingly move within the first portion 422 of the bore 410 (e.g. during pump strokes), and the rod 414 may be configured to sealingly move within the second portion 424 of the bore 420 (e.g. during pump strokes). In embodiments, the power end 310 may further comprise a first seal 451 configured to seal the head 412 with respect to the first portion 422 of the bore 420 (e.g. such that the head 412 and first seal 451 isolate the first cavity 422a from the second cavity 422b) and a second seal 453 configured to seal the rod 414 with respect to the second portion 424 of the bore 420 (e.g. such that the rod 414 and second seal 453 isolate the third cavity 424a from the second cavity 422b). For example, the first seal 451 may be disposed on the head 412 (e.g. a moving seal), such as within one or more groove configured to hold a gasket, or on the bore first portion 422 inner surface (e.g. a stationary seal) and/or the second seal 453 may be disposed on the rod 414 (e.g. a moving seal) or on the bore second portion 424 inner surface (a stationary seal). In some embodiments, the first seal 451 may be a moving seal (e.g. disposed on the head 412) and the second seal 453 may be a stationary seal (e.g. disposed on the inner surface/wall of the bore 420—e.g. within the bore second portion 424—which may in some embodiments comprises pump packing). In some embodiments, one or more stationary seal may be configured to prevent fluid flow between the second portion 424 of the bore and the first portion 422 of the bore and/or to provide a controlled volume of fluid for interaction with the inner volume of the bellows 330. While the discussion has been set forth with regard to a pump 300 having a single bellows 330, similar concepts apply for dual (e.g. double-acting) bellows pumps (e.g. in which a single piston interacts with two bellows, for example such that the discharge stroke for one bellows is the suction stroke for the other).

It can be important for the health of the bellows pump 300 (e.g. to protect the bellows 330 from excessive pressure differentials which could damage the bellows 330) to ensure that the bellows 330 and the piston 410 remain in sync (e.g. with the bellows 330 not exceeding its full permissible extension position when the piston 410 is at its maximum extension at the end of the discharge stroke, and the bellows 330 not exceeding its permissible contraction position when the piston 410 is at its most retracted position at the end of its suction stroke). To aid in maintaining such synchronization between the bellows 330 and the piston 410, the volume of fluid between the rod 414 and the bellows 330 may be maintained at approximately a constant volume. Leaks in the bellows 330 can prove problematic, affecting the amount of sync and potentially damaging the bellows 330. For example, a bellows 330 leak can cause a pressure imbalance between the drive fluid in the bellows 330 and the treatment fluid in the chamber 321, which may damage (e.g. crush) the bellows 330.

Figure 5:
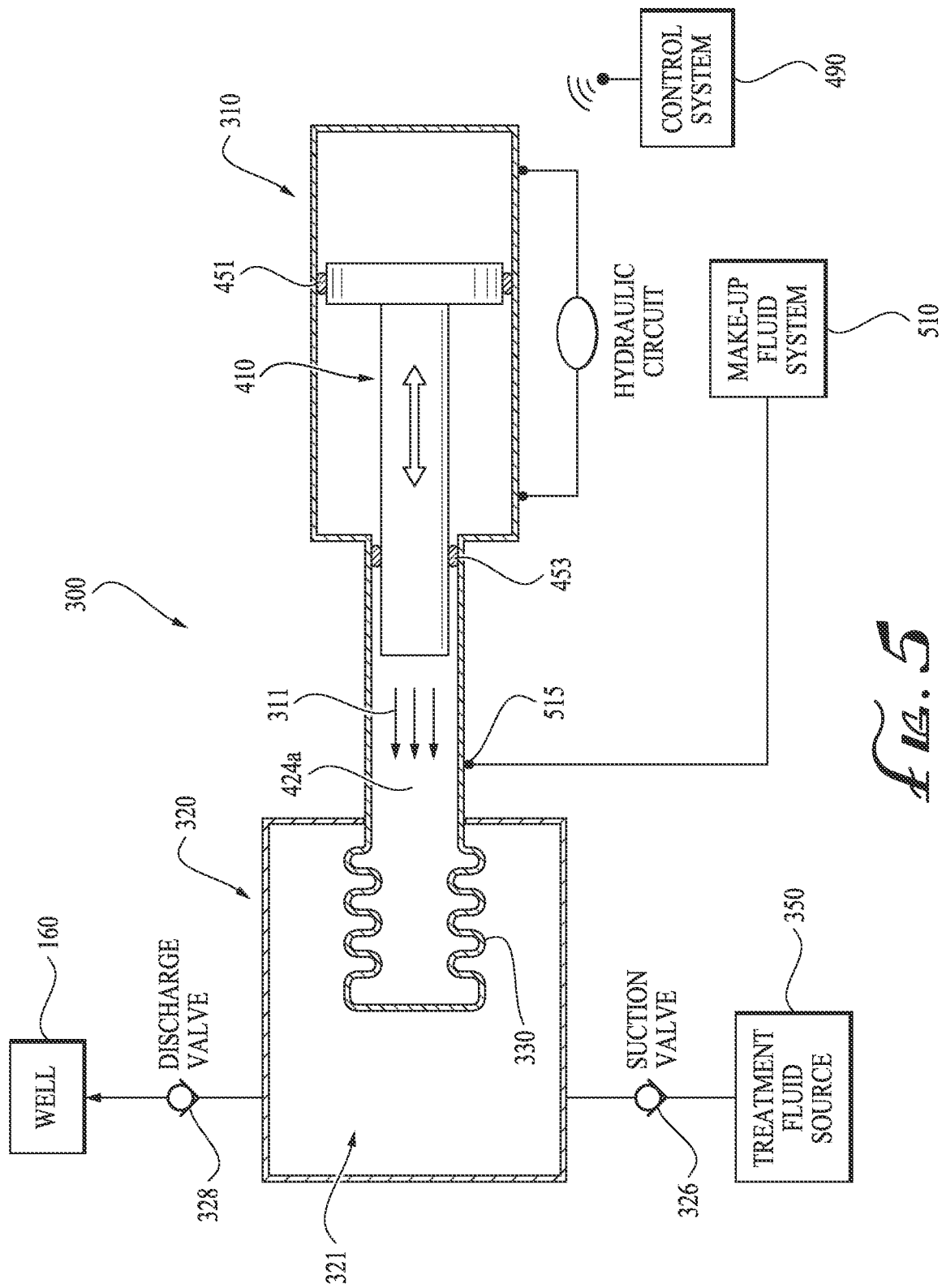
FIG. 5 is a schematic illustration of an exemplary system for providing make-up fluid to an exemplary bellows pump, according to an embodiment of the disclosure.

In order to address any such leak, a make-up system 510 (e.g. as shown schematically with an embodiment of pump 300 in FIG. 5) can be configured to correct/maintain a controlled volume of fluid in the space between the rod 414 and the bellows 330 (for example by injecting make-up fluid, which typically is drive fluid, into the space between the rod 414 and the bellows 330—e.g. into the controlled volume formed by the rod seal 453, such as the third cavity 424a), in order to maintain synchronization between the bellows 330 and the piston 410. For example, the power end 310 may include a make-up port 515 (e.g. a third port), which may be in fluid communication with the second portion 424 of the bore 420 (e.g. the third cavity 424a between the rod 414 and/or rod seal 453 and the bellows 330). While the make-up port 515 is shown with respect to the power end 310 in FIG. 5, in other embodiments, the make-up port 515 may be disposed in the fluid end 320.

A source of make-up fluid may be in fluid communication with the make-up port 515, and the make-up system 510 may further comprise one or more make-up valve configured to open (to provide fluid communication therethrough) and close (to prevent fluid communication therethrough and/or isolate the make-up system 510 from the bellows 330). In some embodiments the make-up system 510 may include a make-up pump, which may be configured to pump make-up fluid from the make-up fluid source into the second portion 424 of the bore 420 through the make-up port 515. The control system 490 in some embodiments may be used to operate the make-up system 510, for example opening and closing the make-up valve and/or operating the make-up pump. In some embodiments, the control system 490 may comprise and/or communicate with one or more sensors, whose data the control system 490 can use to determine if the bellows 330 and piston 410 are out of sync and to operate the make-up system 510 to bring the bellows 330 and piston 410 back into sync. For example, the control system 490 may open the make-up valve and activate the make-up pump to inject make-up fluid into cavity 424a and/or to draw make-up fluid out of cavity 424a via make-up port 515, in order to bring the bellows 330 and the piston 410 back into sync.

In some embodiments, the pump 300 may be one of a plurality of similar pumps which may be configured to operate together/concurrently (e.g. configured to jointly pump fluid in the well 160 and/or which are jointly driven and/or which share a common drive fluid source and/or make-up fluid source and/or which are jointly controlled). For example, the plurality of pumps 330 may share a common source for treatment fluid, drive fluid, and/or make-up fluid. In some embodiments, the drive fluid and the make-up fluid may be drawn from a common fluid source (e.g. drive fluid and make-up fluid may be substantially the same). In some embodiments, the plurality of pumps 330 can share a common driver. In some embodiments, the plurality of pumps 330 may share a common control system 490. In some embodiments, one or more of the plurality of pumps 330 may be configured to be out-of-sync with one or more other of the plurality of pumps 330 (for example with a first pump undergoing a discharge stroke while a second pump undergoes a suction stroke). In some embodiments, having pumps of the plurality of pumps 330 out-of-sync with each other may allow for continuous pumping of treatment fluid (e.g. under approximately constant pressure). In some embodiments, a first half of the plurality of pumps may be in sync with each other, while a second half of the plurality of pumps may be in sync with each other but out of sync with the first half. In some embodiments, the plurality of pumps may comprise at least two dissimilar pumps.

Some embodiments may include a control system 490, which may be configured to monitor and/or control one or more aspects of the bellows pump 300 and/or related treatment system 100 (e.g. a system including at least one bellows pump 300). The control system 490 may include an information handling system (e.g. comprising one or more processor) and/or may be configured to receive data from one or more sensor configured to monitor/detect one or more parameters of the system. In some embodiments, the parameters monitored may include pressure, temperature, flow rate, viscosity, contamination/particle count, strain, valve position, piston position, and/or bellows position. Data from the sensor(s) may be transmitted to and/or received by the information handling system, for example with the control system 490 using the data to monitor and/or control one or more aspect of the bellows pump 300 and/or system 100. In embodiments, the control system 490 may be configured to communicate with sensors and/or other components of the pump or system wirelessly and/or via wired connection.

Figure 6:
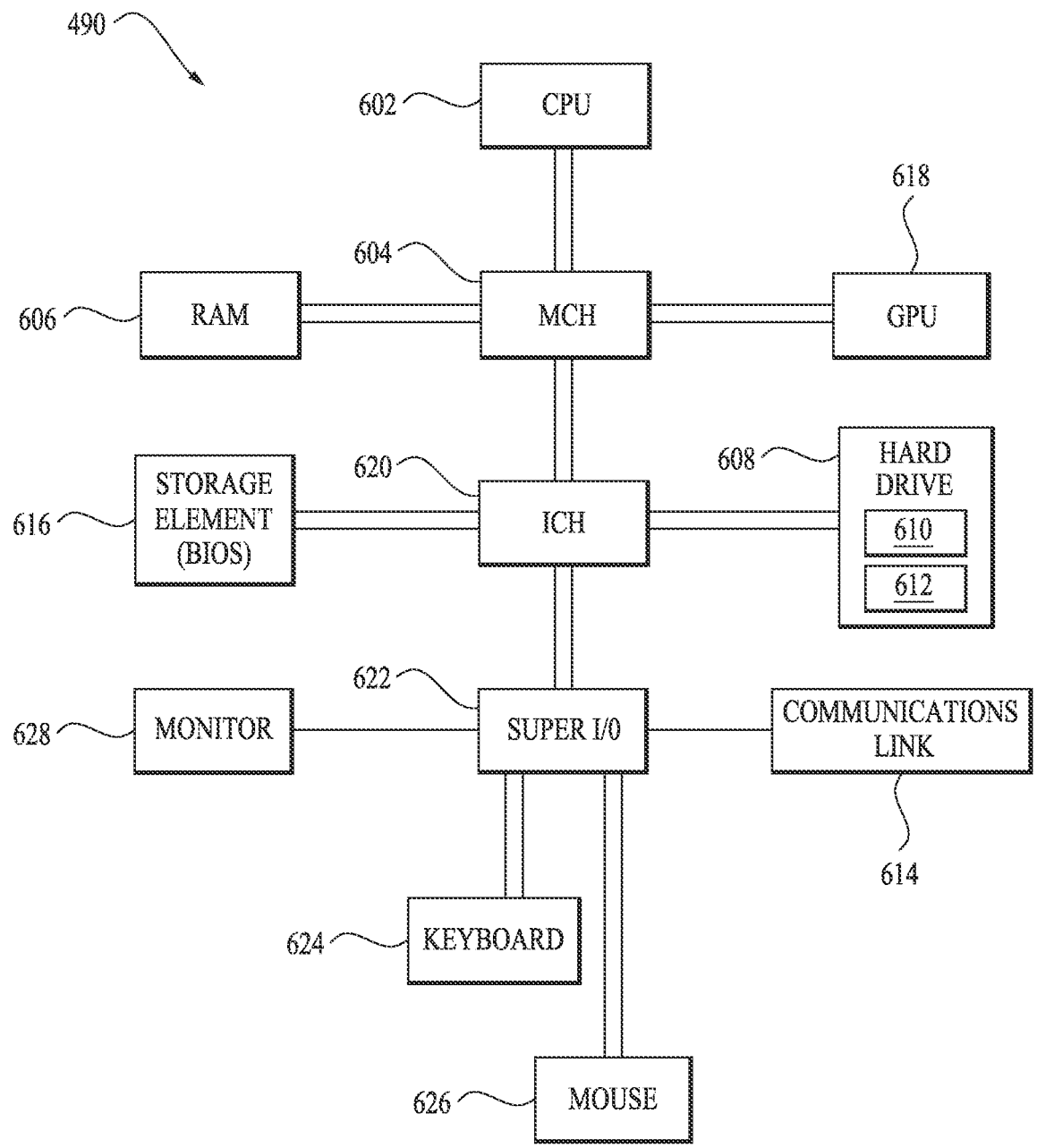
FIG. 6 is a schematic illustration of an exemplary control system, which may be used in conjunction with a bellows pump system, according to an embodiment of the disclosure.

FIG. 6 is a schematic diagram illustrating an exemplary information handling system/control system 490, for example for use with or by an associated treatment system 100 of FIG. 1, according to one or more aspects of the present disclosure. A processor or central processing unit (CPU) 602 of the control system 490 is communicatively coupled to a memory controller hub (MCH) or north bridge 604. The processor 602 may include, for example a microprocessor, microcontroller, digital signal processor (DSP), application specific integrated circuit (ASIC), or any other digital or analog circuitry configured to interpret and/or execute program instructions and/or process data. Processor 602 may be configured to interpret and/or execute program instructions or other data retrieved and stored in any memory (which may for example be a non-transitory computer-readable medium, configured to have program instructions stored therein, or any other programmable storage device configured to have program instructions stored therein) such as memory 606 or hard drive 608. Program instructions or other data may constitute portions of a software or application, for example application 610 or data 612, for carrying out one or more methods described herein. Memory 606 may include read-only memory (ROM), random access memory (RAM), solid state memory, or disk-based memory. Each memory module may include any system, device or apparatus configured to retain program instructions and/or data for a period of time (for example, non-transitory computer-readable media). For example, instructions from a software or application 610 or data 612 may be retrieved and stored in memory 606 for execution or use by processor 602. In one or more embodiments, the memory 606 or the hard drive 608 may include or comprise one or more non-transitory executable instructions that, when executed by the processor 602, cause the processor 602 to perform or initiate one or more operations or steps. The information handling system 600 may be preprogrammed or it may be programmed (and reprogrammed) by loading a program from another source (for example, from a CD-ROM, from another computer device through a data network, or in another manner).

The data 612 may include treatment data, geological data, fracture data, microseismic data, sensor data, or any other appropriate data. In one or more embodiments, the data 612 may include treatment data relating to fracture treatment plans. For example, the treatment data may indicate a pumping schedule, parameters of a previous injection treatment, parameters of a future injection treatment, or one or more parameters of a proposed injection treatment. Such one or more treatment parameters may include information on flow rates, flow volumes, slurry concentrations, fluid compositions, injection locations, injection times, or other parameters. The treatment data may include one or more treatment parameters that have been optimized or selected based on numerical simulations of complex fracture propagation. In one or more embodiments, the data 612 may include geological data relating to one or more geological properties of the subterranean formation 202 (referring to FIG. 2). For example, the geological data may include information on the wellbore 204 (referring to FIG. 2), completions, or information on other attributes of the subterranean formation 202. In one or more embodiments, the geological data may include information on the lithology, fluid content, stress profile (e.g., stress anisotropy, maximum and minimum horizontal stresses), pressure profile, spatial extent, or other attributes of one or more rock formations in the subterranean zone. The geological data may include information collected from well logs, rock samples, outcroppings, microseismic imaging, or other data sources. In one or more embodiments, the data 612 may include fracture data relating to fractures in the subterranean formation 202. The fracture data may identify the locations, sizes, shapes, and other properties of fractures in a model of a subterranean zone. The fracture data may include information on natural fractures, hydraulically-induced fractures, or any other type of discontinuity in the subterranean formation 202. The fracture data may include fracture planes calculated from microseismic data or other information. For each fracture plan, the fracture data may include information (for example, strike angle, dip angle, etc.) identifying an orientation of the fracture, information identifying a shape (for example, curvature, aperture, etc.) of the fracture, information identifying boundaries of the fracture, or any other suitable information.

In embodiments, the sensor data may include data measured/detected by one or more sensors, for example with relation to one or more aspect of the pump 300 and/or the system 100. For example, the sensor data may include pressure (e.g. at the fluid end 320 and/or the power end 310), temperature (e.g. at the fluid end 320 and/or power end 310 and/or make-up system 510), flow rate (e.g. within the fluid end 310 and/or hydraulic circuit 430 and/or the make-up system 510), viscosity (e.g. of treatment fluid in the fluid end 320 and/or drive fluid in the power end 310), contamination/particle count (e.g. at the fluid end 320 and/or power end 310 and/or in the make-up system 510), strain (e.g. at the fluid end 320 and/or power end 310), suction valve 326 and/or discharge valve 328 position, piston position, and/or bellows position. Data received by the control system 490 (e.g. from one or more sensors) may be used to carry out operations with respect to the pump 300 and/or system 100. For example, the control system 490 may evaluate the data and determine one or more action based on the evaluation. In some embodiments, the control system 490 may automatically take action based on the evaluation.

The one or more applications 610 may comprise one or more software applications, one or more scripts, one or more programs, one or more functions, one or more executables, or one or more other modules that are interpreted or executed by the processor 602. For example, the one or more applications 610 may include a fracture design module, a reservoir simulation tool, a hydraulic fracture simulation model, or any other appropriate function block. The one or more applications 610 may include machine-readable instructions for performing one or more of the operations related to any one or more embodiments of the present disclosure. The one or more applications 610 may include machine-readable instructions for generating a user interface or a plot, for example, illustrating fracture geometry (for example, length, width, spacing, orientation, etc.), pressure plot, hydrocarbon production performance, pump performance. The one or more applications 610 may obtain input data, such as treatment data, geological data, fracture data, or other types of input data, from the memory 606, from another local source, or from one or more remote sources (for example, via the one or more communication links 614). The one or more applications 610 may generate output data and store the output data in the memory 606, hard drive 608, in another local medium, or in one or more remote devices (for example, by sending the output data via the communication link 614).

Memory controller hub 604 may include a memory controller for directing information to or from various system memory components within the information handling system 600, such as memory 606, storage element 616, and hard drive 608. The memory controller hub 604 may be coupled to memory 606 and a graphics processing unit (GPU) 618. Memory controller hub 604 may also be coupled to an I/O controller hub (ICH) or south bridge 620. I/O controller hub 620 is coupled to storage elements of the information handling system 600, including a storage element 616, which may comprise a flash ROM that includes a basic input/output system (BIOS) of the computer system. I/O controller hub 620 is also coupled to the hard drive 608 of the information handling system 600. I/O controller hub 320 may also be coupled to an I/O chip or interface, for example, a Super I/O chip 622, which is itself coupled to several of the I/O ports of the computer system, including a keyboard 624, a mouse 626, a monitor (or other display) 628 and one or more communications link 614. Any one or more input/output devices receive and transmit data in analog or digital form over one or more communication links 614 such as a serial link, a wireless link (for example, infrared, radio frequency, or others), a parallel link, or another type of link. The one or more communication links 614 may comprise any type of communication channel, connector, data communication network, or other link. For example, the one or more communication links 614 may comprise a wireless or a wired network, a Local Area Network (LAN), a Wide Area Network (WAN), a private network, a public network (such as the Internet), a WiFi network, a network that includes a satellite link, or another type of data communication network.

Modifications, additions, or omissions may be made to FIG. 6 without departing from the scope of the present disclosure. For example, FIG. 6 shows a particular configuration of components of control system 490. However, any suitable configurations of components may be used. For example, components of control system 490 may be implemented either as physical or logical components. Furthermore, in some embodiments, functionality associated with components of control system 490 may be implemented in special purpose circuits or components. In other embodiments, functionality associated with components of control system 490 may be implemented in configurable general-purpose circuit or components. For example, components of control system 490 may be implemented by configured computer program instructions.

In a bellows-style pump, detecting leakage with respect to the valves and/or bellows can be important, for example for pump durability, reliability, maintenance, and life. Valve leakage may lead to less effective pumping of treatment fluid downhole in the well and/or may lead to damage to pump components (such as the bellows). For example, a pressure differential across the bellows (e.g. between the treatment fluid in the chamber of the fluid end and the drive fluid in the inner volume of the bellows) can result in damage to the bellows. Additionally, bellows-style pumps may be prone to fatigue failure or mechanical or hydraulic damage, for example due to high-pressure drive fluid that expands the bellows and which, over time, may result in damage or wear of the bellows in the bellows pump. Such damage or wear of the bellows may allow the high-pressure pumped treatment fluid to leak through the barrier provided by the bellows, potentially entering the bellows and thereby causing contamination of the drive fluid of the power end of the bellows pump (which could, in turn, cause further damage to the pump). Additionally, such damage or wear of the bellows may allow drive fluid to leak out of the bellows, escaping containment and potentially causing damage to the bellows during pumping operations due to resulting pressure imbalances in the pump (e.g. due to the bellows and the piston being out of sync). Early and effective leakage detection can prevent costly damage.

The disclosed embodiments may provide mechanisms for sensing, detecting, and/or monitoring this type of issue (e.g. leakage with respect to the valves of the fluid end and/or the bellows). Disclosed embodiments may relate to a bellows pump system in which one or more sensors disposed on one or more components of the pump can monitor for indications of valve leakage and/or bellows leakage (e.g. the bellows being out of sync with the piston). Analysis based on the sensor data may be used to determine valve and/or bellows leakage.

Figure 3:
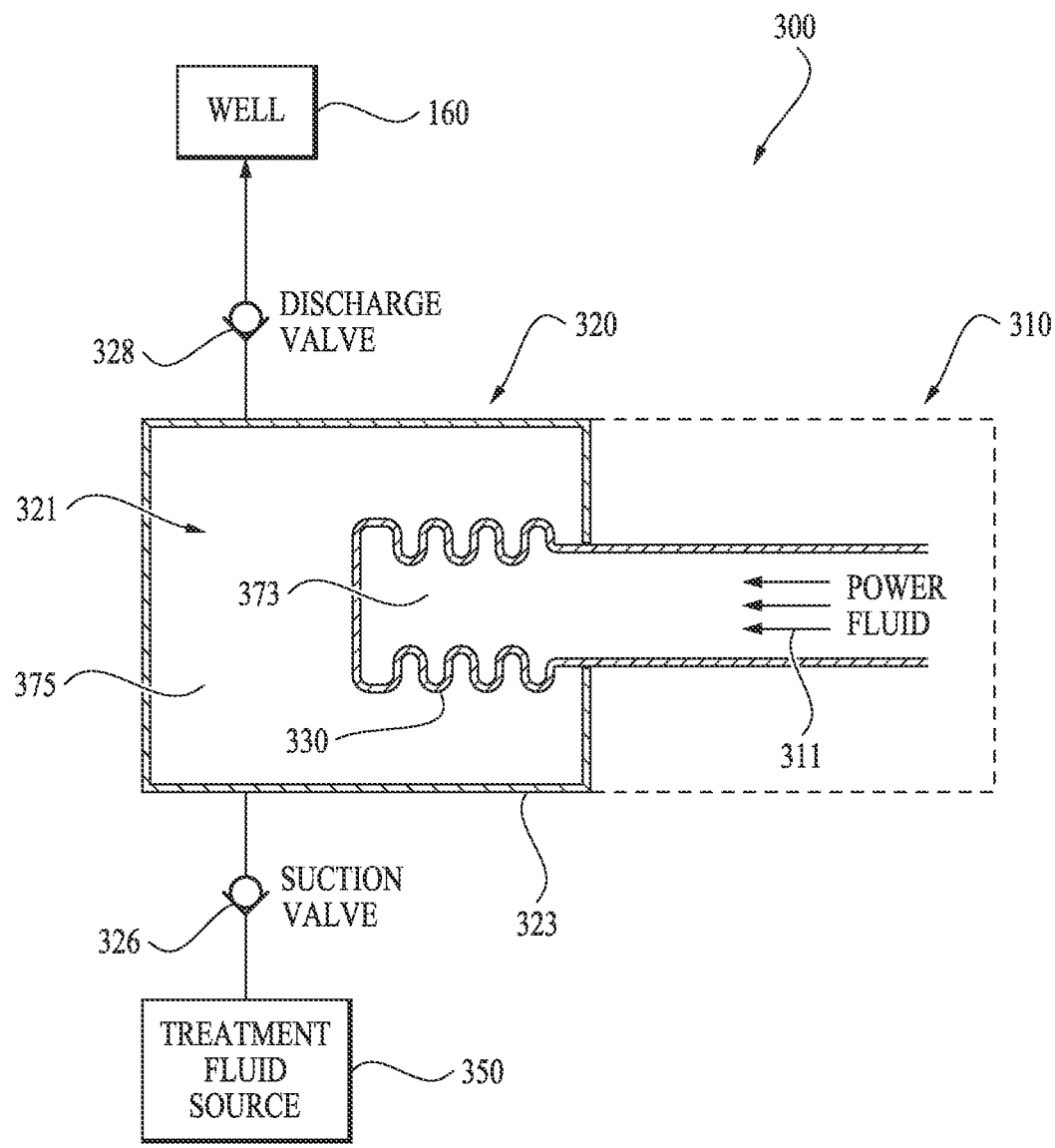
FIG. 3 is a schematic illustration of an exemplary bellows pump, according to an embodiment of the disclosure.
Figure 7:
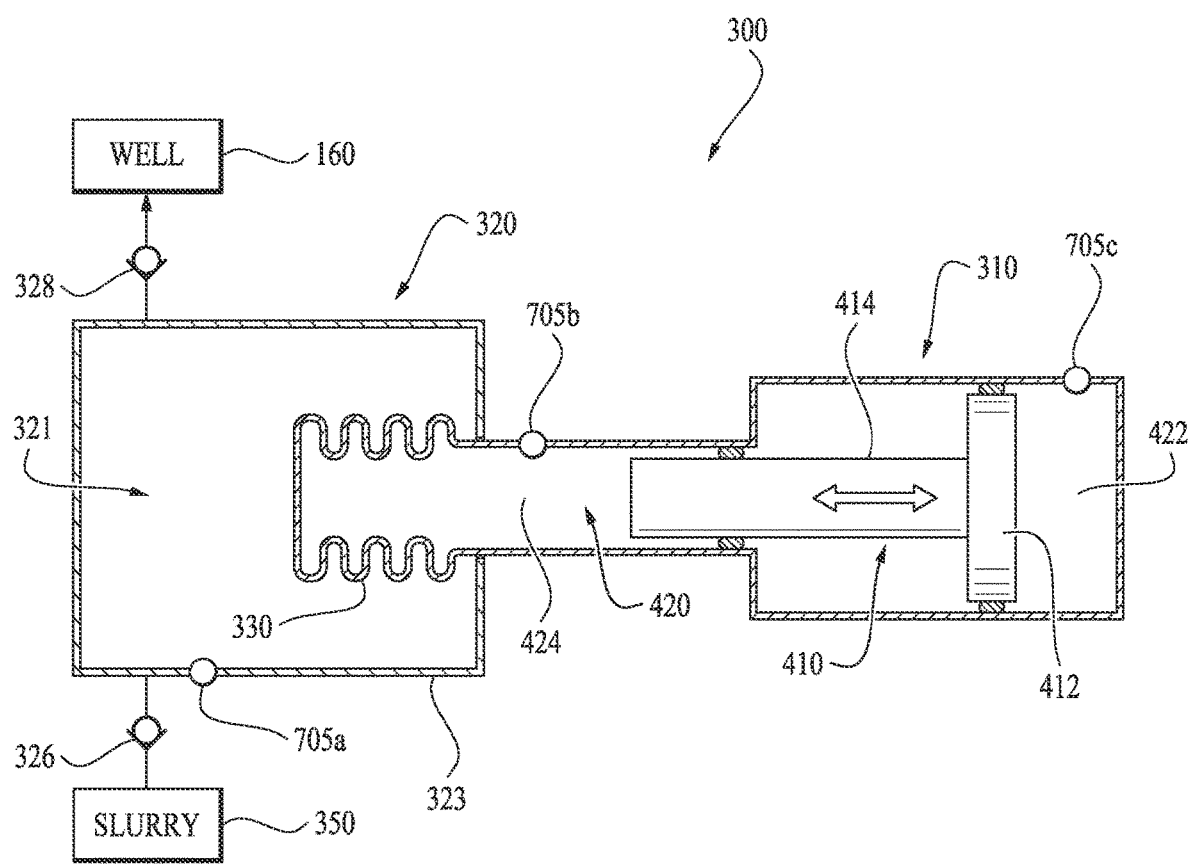
FIG. 7 is a schematic illustration of an exemplary bellows pump having one or more strain gauge, according to an embodiment of the disclosure.

FIG. 7 is a schematic illustration of an exemplary bellows pump 300 embodiment, similar to the pump embodiments shown in FIGS. 3-5, having one or more sensors configured to measure strain. For example, the pump 300 may have a power end 310, a fluid end 320, an expandable bellows 330, one or more sensors configured to measure strain (e.g. one or more strain gauge 705), and a control system 490 (e.g. similar to that discussed with respect to FIG. 4) which is configured to receive data from the one or more strain gauge 705 and to monitor for valve health. The fluid end 320 can have a fluid end housing 323 with a chamber 321, a suction valve 326 (e.g. in fluid communication with the chamber 321 and a source for the treatment fluid and/or configured for introduction of treatment fluid into the chamber 321), and a discharge valve 328 (e.g. in fluid communication with the chamber 321 and the well and/or configured for injection of treatment fluid from the chamber 321 into a well). The power end 310 in FIG. 7 is configured to reciprocally expand/inflate and contract/deflate the bellows 330 based on movement of drive fluid and/or the bellows 330 is configured to expand within the chamber 321 of the fluid end 320 based on movement of the drive fluid. Typically, the suction valve 326 may be a one-way check valve configured to allow treatment fluid from the treatment fluid source to enter the chamber 321 (e.g. during a suction stroke of the pump 300), while preventing treatment fluid from exiting the chamber 321 therethrough, and the discharge valve 328 may be a one-way check valve configured to allow treatment fluid to exit the chamber 321 (e.g. during a power stroke of the pump 300), while preventing treatment fluid from entering the chamber 321 therethrough.

In some embodiments, the power end 310 may include a piston 410 configured to reciprocally move drive fluid (e.g. in and out of the bellows 330), for example similar to that in FIG. 4. For example, the piston 410 may be disposed within a bore 420 in the power end 310, and the bore 420 may be in fluid communication with the bellows 330 (e.g. an internal volume of the bellows). In some embodiments, the piston 410 may have a head 412 and a rod 414 (e.g. with the rod 414 extending from the head 412 and being disposed between the head 412 and the bellows 330). In some embodiments, the rod 414 can have a smaller diameter than the head 412. In some embodiments, the bore 420 may include a first portion 422 with an inner diameter configured for movement of the head 412 (axially) therethrough and a second portion 424 with an inner diameter configured for movement of the rod 414 (axially) therethrough. For example, the head 412 may be configured to sealingly move within the first portion 422 of the bore 420 (e.g. during pump strokes), and the rod 414 may be configured to sealingly move within the second portion 424 of the bore 420 (e.g. during pump strokes). In some embodiments, a first seal disposed on the head 412 can be a moving seal, and a second seal disposed within the second portion of the bore 414 can be a stationary seal. It should be noted that the embodiment shown in FIG. 7 may include a hydraulic circuit as the driver mechanism for the piston 410 (e.g. similar to FIG. 4), but other embodiments may use a different driver mechanism for the piston 410 or may not use a piston at all (but instead may have another mechanism to reciprocally move fluid in and out of the bellows 330).

In some embodiments, the one or more strain gauge 705 can be disposed in the fluid end 320 and/or on (e.g. configured to measure strain in) the fluid end housing 323 (e.g. in the chamber wall, a slurry valve housing, a bellows housing, or a manifold member between the valve housing and the bellows) and/or in the power end 310 and/or on the power end housing (e.g. with respect to the first portion of the bore 420 and/or the second portion of the bore 420). For example, FIG. 7 illustrates several exemplary locations for one or more the strain gauge 705 to be located (see for example 705a illustrating a strain gauge 705 at an exemplary location on the chamber housing 323, 705b illustrating a strain gauge 705 at an exemplary location in the second portion 424 of the bore 420, and 705c illustrating a strain gauge 705 in the first portion 422 of the bore 420). In some embodiments, the one or more strain gauge 705 may be only one strain gauge (for example, located at one of the positions 705a, b, c). In other embodiments, the one or more strain gauge 705 may include a first strain gauge 705 on the fluid end 320 (e.g. similar to position 705a) and a second strain gauge 705 on the power end 310 (e.g. similar to 705b or 705c). In some embodiments, the one or more strain gauge 705 may be externally mounted (e.g. on the fluid end housing and/or the power end housing), which may provide easier access to the one or more strain gauge 705 and/or protect the one or more strain gauge 705 from exposure to pressure, contaminants, etc.

Figure 8A:
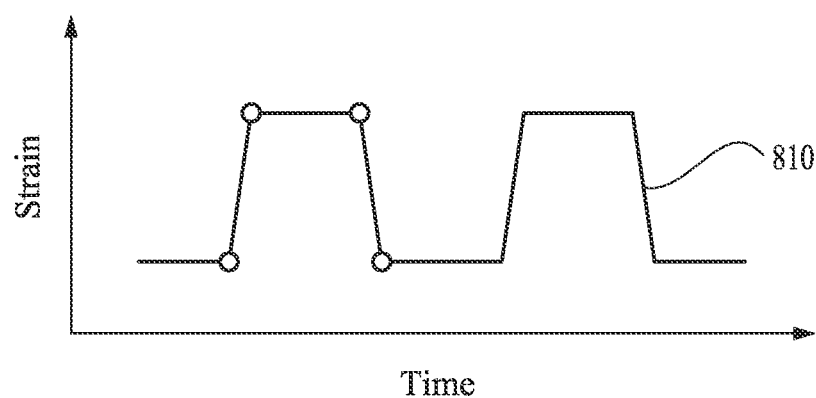
FIG. 8A is a chart illustrating exemplary strain gauge data from the one or more strain gauge of FIG. 7 (e.g. when the pump valves are healthy), according to an embodiment of the disclosure.
Figure 8B:
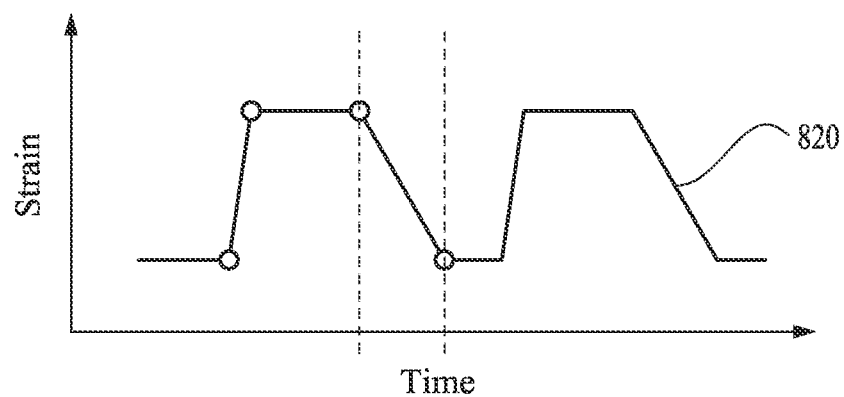
FIG. 8B is a chart illustrating exemplary strain gauge data from the one or more strain gauge of FIG. 7 (e.g. when the discharge valve is leaking), according to an embodiment of the disclosure.
Figure 8C:
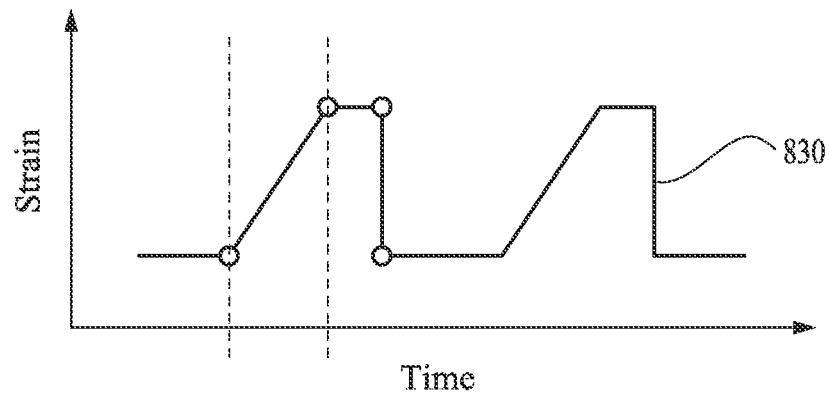
FIG. 8C is a chart illustrating exemplary strain gauge data from the one or more strain gauge of FIG. 7 (e.g. when the suction valve is leaking), according to an embodiment of the disclosure.

The one or more strain gauge 705 each measures strain, for example sending strain data to the control system 490. In some embodiments, the control system 490 may include a monitor configured to visually display the data from the one or more strain gauge 705. FIGS. 8A-C illustrate exemplary strain data charts, which may be useful in detecting valve leakage. For example, FIG. 8A illustrates an exemplary normal strain data chart with a strain signal 810 for a healthy pump 300 in which the suction valve 326 and discharge valve 328 are operating properly. FIG. 8B illustrates an exemplary strain data chart with a strain signal 820 in which the discharge valve 328 is leaking, creating a longer strain decay from peak over time (e.g. for each strain cycle). For example, in FIG. 8B, the strain decay from peak takes a longer period of time (for example, compared to FIG. 8A). FIG. 8C illustrates an exemplary strain data chart with a strain signal 830 in which the suction valve 326 is leaking, creating a longer strain rise to peak over time (e.g. for each strain cycle). For example, in FIG. 8C, the strain rise to peak takes a longer period of time (for example, compared to FIG. 8A). An operator may be able to see valve issues when the strain sensor data is visually displayed.

Alternatively, the strain data may be similarly used, for example by the control system 490, to determine valve leakage. For example, strain decay from peak may be monitored, e.g. by the control system 490, as an indicator of discharge valve 328 health/leakage. In some embodiments, strain decay from peak (e.g. the amount of time it takes for strain to decay from peak level to valley/base level) exceeding a corresponding (e.g. strain decay from peak) threshold can be indicative of a discharge valve 328 leak. In some embodiments, the strain decay from peak threshold may be pre-set, for example based on historical data. In some embodiments, strain decay from peak analysis may be based on the slope of strain versus time (e.g. the steepness and/or the rate of change of the slope).

In some embodiments, strain rise to peak may be monitored, e.g. by the control system 490, as an indicator of suction valve 326 health/leakage. In some embodiments, strain rise to peak (e.g. the amount of time it takes for strain to rise from floor/valley/base/low level to peak level) exceeding a corresponding (e.g. strain rise to peak) threshold can be indicative of a suction valve 326 leak. In some embodiments, the strain rise to peak threshold may be pre-set, for example based on historical data. In some embodiments, strain rise to peak analysis may be based on the slope (e.g. the steepness and/or rate of change of the slope).

Some embodiments may include a plurality of strain gauges 705. For example, a first strain gauge 705a may be disposed on the fluid end 320 and a second strain gauge (e.g. either 705b or 705c) may be disposed on the power end 310. In embodiments, offset between the first strain gauge data and the second strain gauge data may be monitored by the control system 490. In some embodiments, the pump 300 can be one of a plurality of similar pumps (e.g. configured to jointly pump fluid downhole in the well and/or jointly driven—see for example FIG. 16), wherein the control system 490 (e.g. for all of the plurality of pumps) compares strain data from the plurality of pumps and initiates action only in the event that one of the plurality of pumps 300 is more than a pre-set percentage from the mean/average of the plurality of pumps (e.g. indicting too much drift). For example, the threshold(s) can be set based on comparative data from the plurality of pumps (e.g. rather than using pre-set threshold ranges).

In embodiments, the control system 490 can be configured to initiate an action in response to detecting a leak (e.g. either a discharge valve 328 leak or suction valve 326 leak). For example, the action can include sending an alert (e.g. with visual and/or audio display) and/or stopping pumping of treatment fluid into the well (e.g. shutting down the driver and/or preventing movement of the bellows and/or the piston/plunger).

Figure 9:
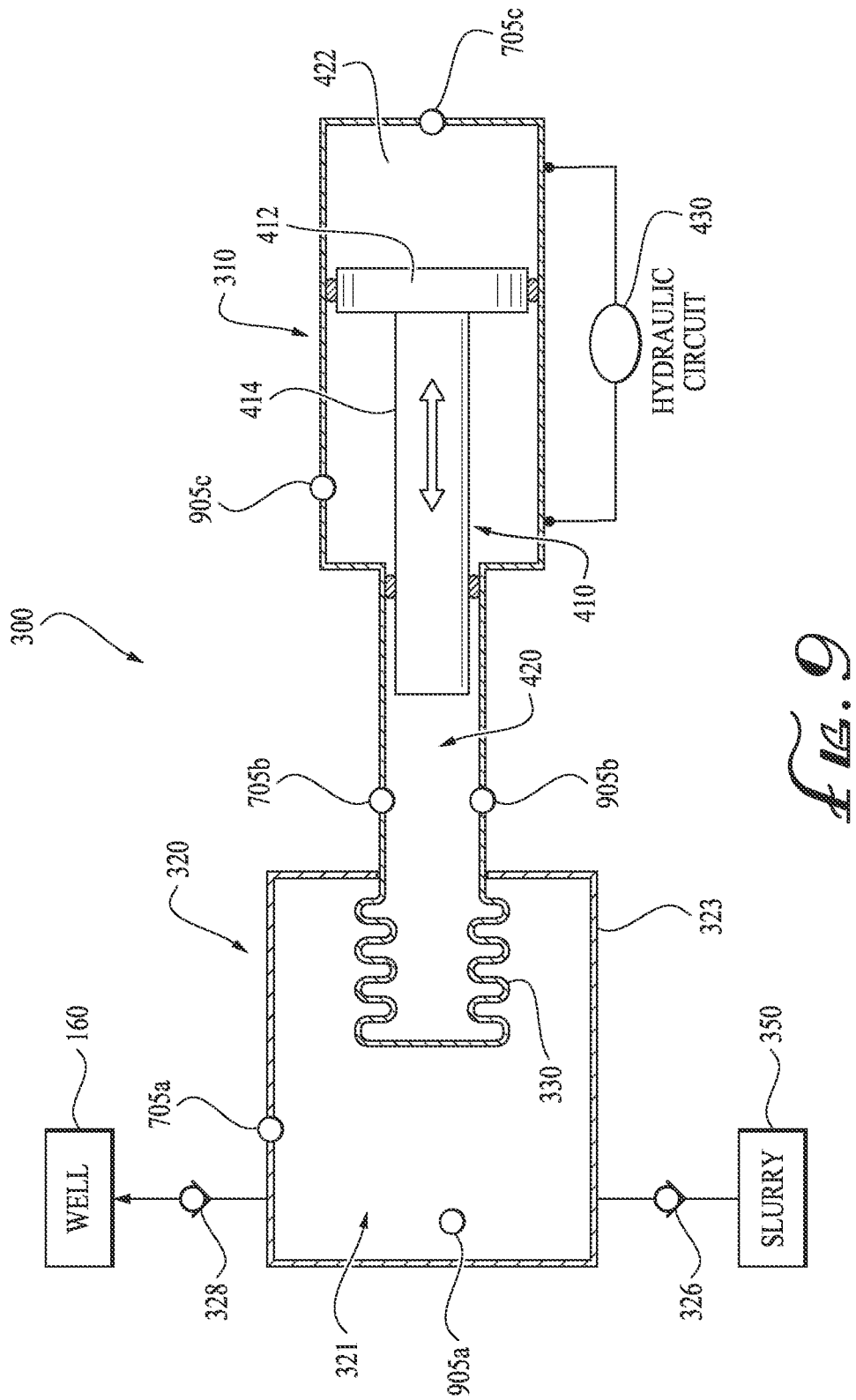
FIG. 9 is a schematic illustration of an exemplary bellows pump having one or more strain gauge and one or more position sensor, according to an embodiment of the disclosure.

FIG. 9 provides a schematic illustration of a pump 300 similar to that discussed with respect to FIG. 7, which also includes one or more position sensor 905 (e.g. configured to monitor the position of one or more component of the pump 300). So for example, in addition to having one or more strain gauge 705 (e.g. which can be located at exemplary positions 705a, b, c), the pump 300 of FIG. 9 may also have one or more position sensor 905. The one or more position sensor 905 can be located at various positions on the pump 300 (e.g. see exemplary locations 905a, b, c) and/or to monitor the position of various components of the pump 300. And while the embodiment shown in FIG. 9 includes a hydraulic circuit as the driver mechanism for the piston 410, other similar embodiments may use a different driver mechanism for the piston 410 or may not use a piston at all (but instead may have another mechanism to reciprocally move fluid in and out of the bellows 330). In embodiments, the controller 490 can be configured to correlate data from the one or more position sensor 905 with data from the one or more strain gauge 705 (e.g. overlaying a position chart and the strain chart and/or use position data to check/match-up timing with the strain data).

Figure 10:
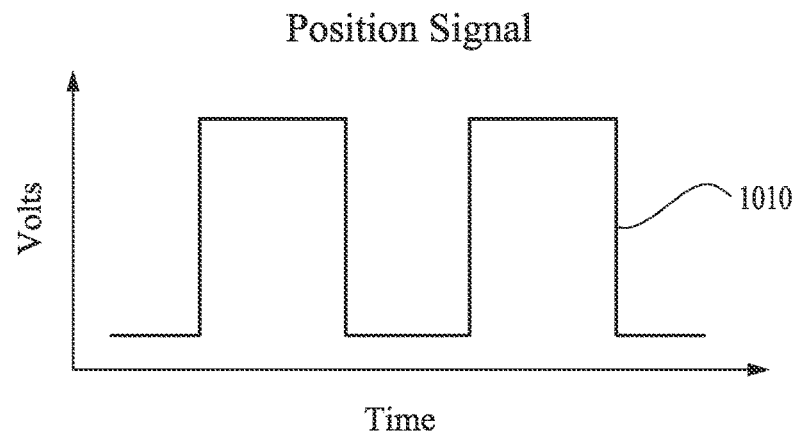
FIG. 10 is a chart illustrating exemplary position data from the one or more position sensor of FIG. 9, according to an embodiment of the disclosure.

FIG. 10 illustrates an exemplary chart of the position data from the one or more position sensor, with position signal 1010 showing position versus time. Such a chart may be visually displayed by the control system 490, for example on the monitor. In the example of FIG. 10, the position data from the one or more position sensor 905 may be shown in volts (e.g. with voltage correlating to distance in a known way), with the voltage from the position sensor(s) 905 being displayed versus time. In some embodiments, the control system 490 may use data from the one or more position sensor 905 to interpret the data from the one or more strain gauge 705. For example, offset between the data/chart of the one or more position sensor 905 and the one or more strain gauge 705 can be monitored. In some embodiments, the position data may help monitor the timing of the strain gauge data and/or may be used with respect to valve timing.

In some embodiments, the one or more position sensor 905 can be disposed on the fluid end 310 (e.g. within the chamber 321 and/or configured to detect position of the bellows 330 in the chamber 321 and/or on the bellows 330) and/or the power end 310 (e.g. in the first portion 422 of the bore 420 and/or the second portion 424 of the bore 420 and/or configured to detect the position of the head 412 and/or the rod 414 of the piston 410). In some embodiments, the one or more position sensor 905 may comprise two position sensors, for example with a first position sensor 905a configured to detect the position of the bellows 330 and a second position sensor 905b or 905c configured to detect the position of the piston 410 (e.g. the head and/or rod). In some embodiments, the second position sensor may be a hydraulic motor head position sensor. For example, the first position sensor 905a can be configured to detect the position of the bellows 330 (e.g. the amount of extension and/or the position of the far end of the bellows 330 away from the power end 310 and/or towards the opposite side of the chamber 321), and the second position sensor 905b or 905c configured to detect the position of the piston 410 (e.g. the amount of extension).

In some embodiments, the first position sensor 905a can be disposed in the chamber 321 of the fluid end 320. For example, the first position sensor 905a may be mounted opposite the bellows 330 in the chamber 321 and directed at the far end of the bellows 330 (e.g. measuring distance between the sensor 905a and the bellows 330, for example using an optical eye). In some embodiments, the second position sensor 905b, c can be disposed in the bore 420 of the power end 310 and/or in proximity to the piston 410. For example, the second position sensor 905b can be disposed in the second portion 424 of the bore 420 and/or in proximity to the rod 414 of the piston 410. In some embodiments, the second position sensor 905c can be disposed in proximity to the head 412 of the piston 410 and/or disposed in the first portion 422 of the bore 420 and/or disposed with the head 412 of the piston 410 between the second position sensor 905c and the bellows 330. For example, the second position sensor 905c may be mounted opposite the head 412 in the first portion 422 of the bore 420 and directed at the head 414 and/or in some embodiments may be mounted on or within the piston 410 itself.

In embodiments, the control system 490 may be configured to receive data from the first and second position sensors 905 and to monitor for bellows health. In embodiments, a difference (e.g. offset) between the position of the bellows 330 (e.g. with respect to the chamber 321) and the position of the piston 410 (e.g. the rod and/or head) can be monitored (e.g. by the control system 490) as an indicator of bellows health (e.g. whether or not the bellows 330 and the piston 410 are in sync). For example, the position of the bellows 330 relative to the position of the piston 410 (e.g. during discharge and suction strokes) can be monitored. In some embodiments, the difference (e.g. offset) between the position of the bellows 330 and the position of the piston 410 extending beyond (e.g. +/−) a (e.g. position) threshold range can be indicative of potential leakage with respect to the bellows 330 (which could impact whether the bellows 330 is in sync with the piston 410). In some embodiments, the control system 490 may monitor whether the difference is constant or changing over time, with changes potentially being indicative of the bellows 330 and the piston 410 being out of sync.

In some embodiments, the position threshold may be pre-set (e.g. based on historical data). In some embodiments, the control system 490 may be configured to initiate an action in response to detecting a bellows 330 leak and/or out of sync (e.g. the offset extending beyond the threshold). For example, the action may comprise sending an alert (e.g. with visual and/or audio display) and/or stopping pumping of treatment fluid (e.g. shutting down the driver and/or preventing movement of the bellows and/or the piston/plunger) and/or operating a make-up system to restore sync (e.g. as discussed with respect to FIG. 5 for example). In some embodiments, the pump 300 can be one of a plurality of similar pumps (e.g. configured to jointly pump fluid downhole in the well and/or jointly driven), and the control system 490 (e.g. for all of the plurality of pumps) can compare position data from the plurality of pumps and initiate action only in the event that one of the plurality of pumps is more than a pre-set percentage from the mean/average of the plurality of pumps (e.g. too much position drift). See for example, FIG. 16. In some embodiments, the position threshold range may be based on comparative data from the plurality of pumps.

In some embodiments, the pump 300 can comprise both one or more strain sensor 705 and one or more position sensor 905, and the controller 490 may monitor for incomplete fill based on both strain and position data. For example, if the piston 410 is extending (e.g. towards the bellows 330) and the strain level sensed is not rising to an expected level (e.g. based on comparison of multiple strain gauges, comparison of multiple pumps configured for joint pumping, and/or based on pre-set threshold (e.g. from historical data)), the controller 490 may take action. In some embodiments, one or more pressure sensor may be used in place of or in conjunction with the one or more strain gauge (e.g. with a first pressure sensor configured to detect pressure in the chamber 321 of the fluid end 320 and/or a second pressure sensor configured to detect pressure in the power end 310 (e.g. the first portion of the bore and/or the second portion of the bore)).

Figure 11:
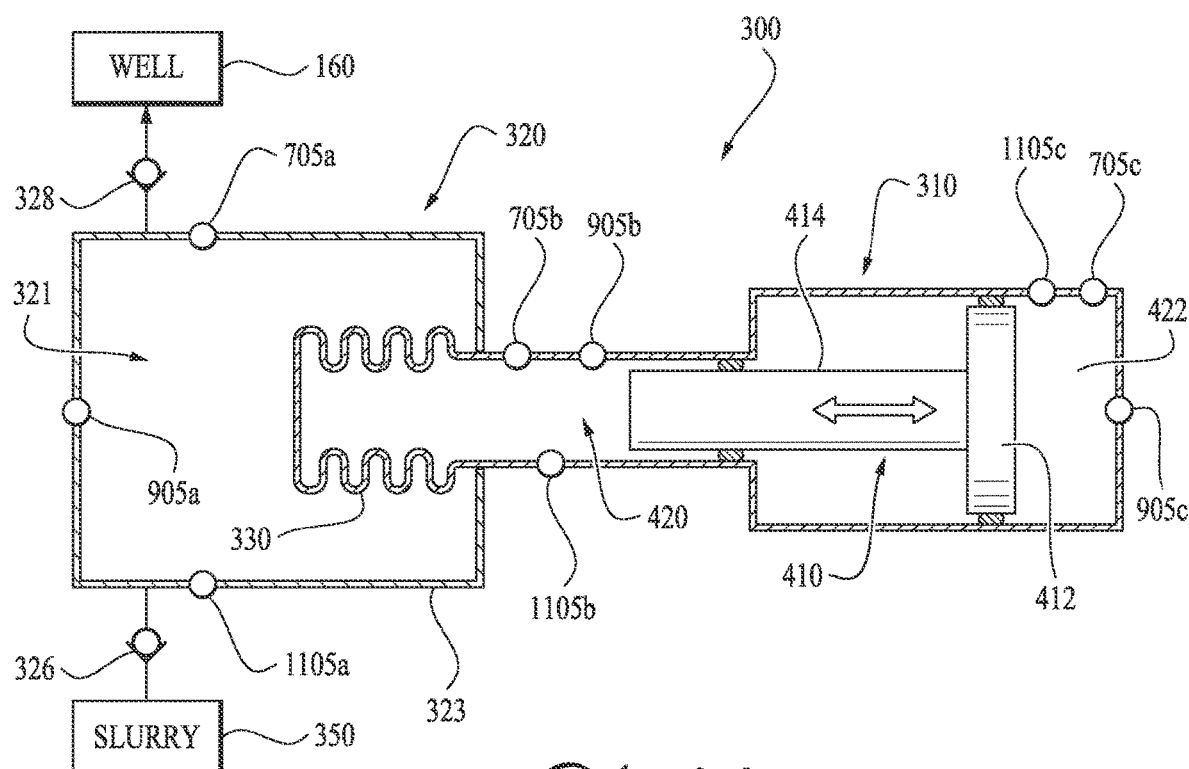
FIG. 11 is a schematic illustration of an exemplary bellows pump having one or more strain gauge, one or more position sensor, and one or more pressure sensor, according to an embodiment of the disclosure.

FIG. 11 provides a schematic illustration of a pump 300 similar to that discussed with respect to FIG. 9, which also includes one or more pressure sensor 1105 (e.g. configured to monitor the pressure at one or more location within the pump 300). So for example, in addition to having one or more strain gauge 705 (e.g. which can be located at exemplary positions 705a, b, c) and one or more position sensor 905 (which can be located at exemplary positions 905a, b, c), the pump 300 of FIG. 11 may also have one or more pressure sensor 1105. The one or more pressure sensor 1105 can be located at various positions on the pump 300 (e.g. see for example exemplary locations 1105a, b, c) and/or configured to monitor the pressure at the chamber 321 of the fluid end 320 and/or at one or more locations within the bore 420 of the power end 310.

In embodiments, the control system 490 may be configured to correlate data from the one or more pressure sensor 1105 and data from the one or more strain gauge 705 (e.g. using the one or more position sensor 905). In some embodiments, pressure decay from peak may be monitored (e.g. by the control system 490) as an indicator of discharge valve health/leakage, and in some instances may be compared to the strain decay from peak over the same time. For example, the pressure decay from peak (e.g. the amount of time it takes for pressure data to decay from the peak value to a floor value in a pressure cycle) exceeding a corresponding (e.g. pressure decay from peak) threshold can be indicative of a discharge valve 328 leak (e.g. similar to FIG. 8B, but with pressure data taking the place of strain data). In some embodiments, pressure decay from peak may be based on slope of pressure versus time (e.g. steepness and/or the rate of change of the slope). In some embodiments, the decay from peak threshold can be pre-set, while in other embodiments, the threshold may be based on comparative data from a plurality of similar pumps working together to pump fluids downhole.

In some embodiments, the pressure rise to peak can be monitored (e.g. by the control system 490) as an indicator of suction valve 326 health/leakage. For example, the pressure rise to peak (e.g. the amount of time it takes for pressure data to rise from the floor value to the peak value in a cycle) exceeding a corresponding (e.g. pressure rise to peak) threshold can be indicative of a suction valve 326 leak (similar to FIG. 8C, but with pressure data taking the place of strain data). In some embodiments, pressure rise to peak may be based on slope of pressure versus time (e.g. steepness and/or rate of change of the slope). In some embodiments, the rise to peak threshold can be pre-set, while in other embodiments, the threshold may be based on comparative data from a plurality of similar pumps working together to pump fluids downhole.

Figure 12:
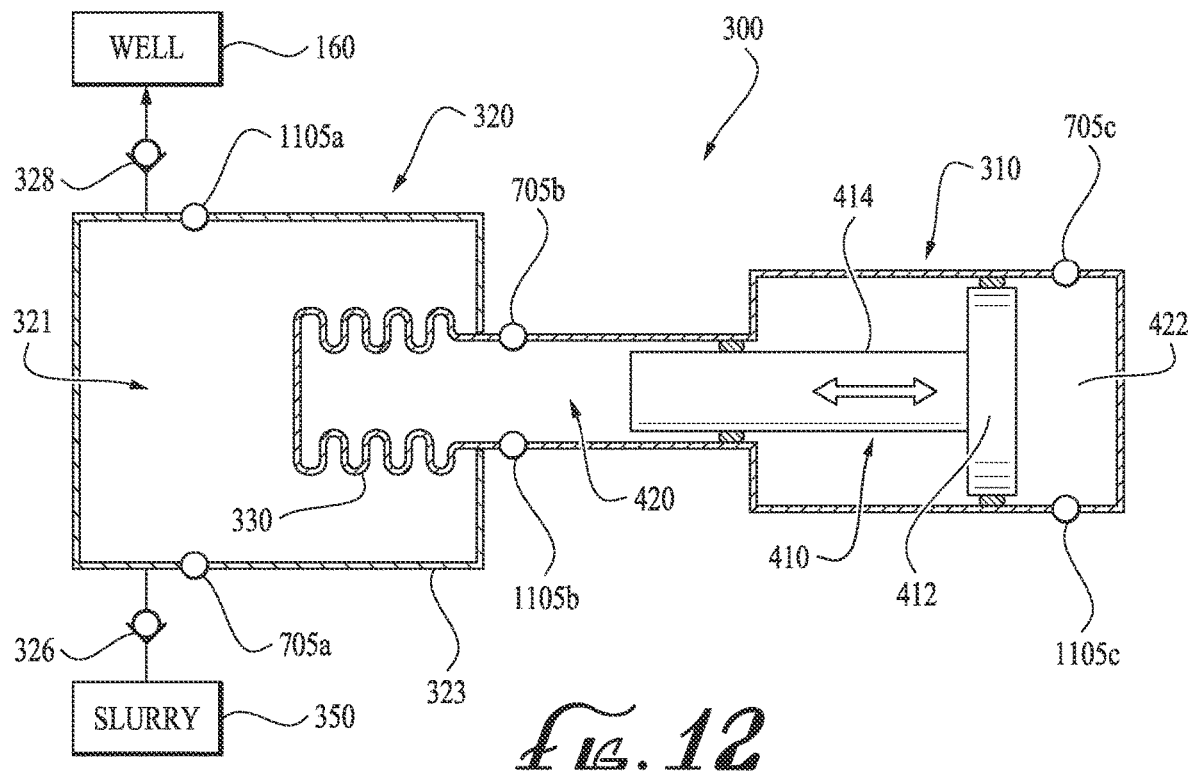
FIG. 12 is a schematic illustration of an exemplary bellows pump having one or more strain gauge and one or more pressure sensor, according to an embodiment of the disclosure.

FIG. 12 provides a schematic illustration of a pump 300 similar to that discussed with respect to FIG. 11, but without the one or more position sensors. The pump 300 embodiment of FIG. 12 may have sensors detecting strain and pressure at one or more locations. So for example, in addition to having one or more strain gauge 705 (e.g. which can be located at exemplary positions 705a, b, c), the pump 300 of FIG. 12 may also have one or more pressure sensor 1105 (e.g. which can be located at exemplary positions 1105a, b, c). In embodiments, the pump 300 may be configured to measure strain and pressure, and to correlate the data readings (for example with the control system 490 analyzing the data to monitor for valve health, similar to the discussion with respect to FIG. 11).

Figure 13:
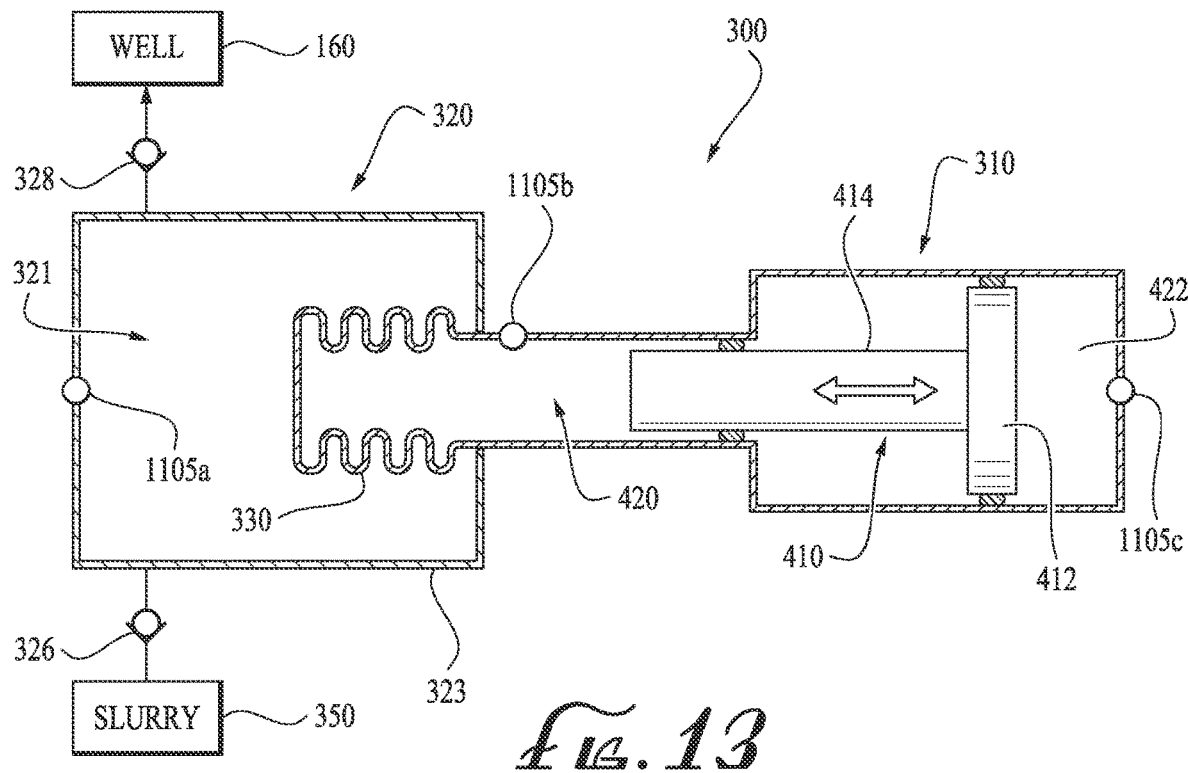
FIG. 13 is a schematic illustration of an exemplary bellows pump having one or more pressure sensor, according to an embodiment of the disclosure.

FIG. 13 provides a schematic illustration of a pump 300 similar to that discussed with respect to FIG. 11, but without the one or more position sensors and without the one or more strain sensor. Stated another way, the pump 300 of FIG. 13 may be similar to that of FIG. 12, but without the one or more strain sensor. Thus, the pump 300 embodiment shown in FIG. 13 may be configured with one or more sensor 1105 detecting pressure at one or more locations. The control system 490 may use the pressure data similar to the discussion with respect to FIG. 11 (e.g. to detect valve leakage). For example, the one or more pressure sensor 1105 (e.g. which can be located at exemplary positions 1105a, b, c) can be disposed on (e.g. configured to measure pressure in) the chamber 321 of the fluid end 320 and/or the bore 420 of the power end 310 (e.g. with respect to the first portion 422 of the bore 420 and/or the second portion 424 of the bore 420). In embodiments, pressure decay from peak can be monitored (e.g. by the control system 490) as an indicator of discharge valve 328 health/leakage and/or pressure rise to peak can be monitored (e.g. by the control system 490) as an indicator of suction valve 326 health/leakage. Some pump 300 embodiments may include a plurality of pressure sensors 1105. For example, a first pressure sensor 1105a can be disposed on the fluid end 320 (e.g. in the chamber 321) and a second pressure sensor (e.g. 1105 b or 1105c) can be disposed on the power end 310 (e.g. in the bore 410). In some embodiments, offset between the first pressure sensor data and the second pressure sensor data can be monitored (e.g. by the control system 490).

Figure 14:
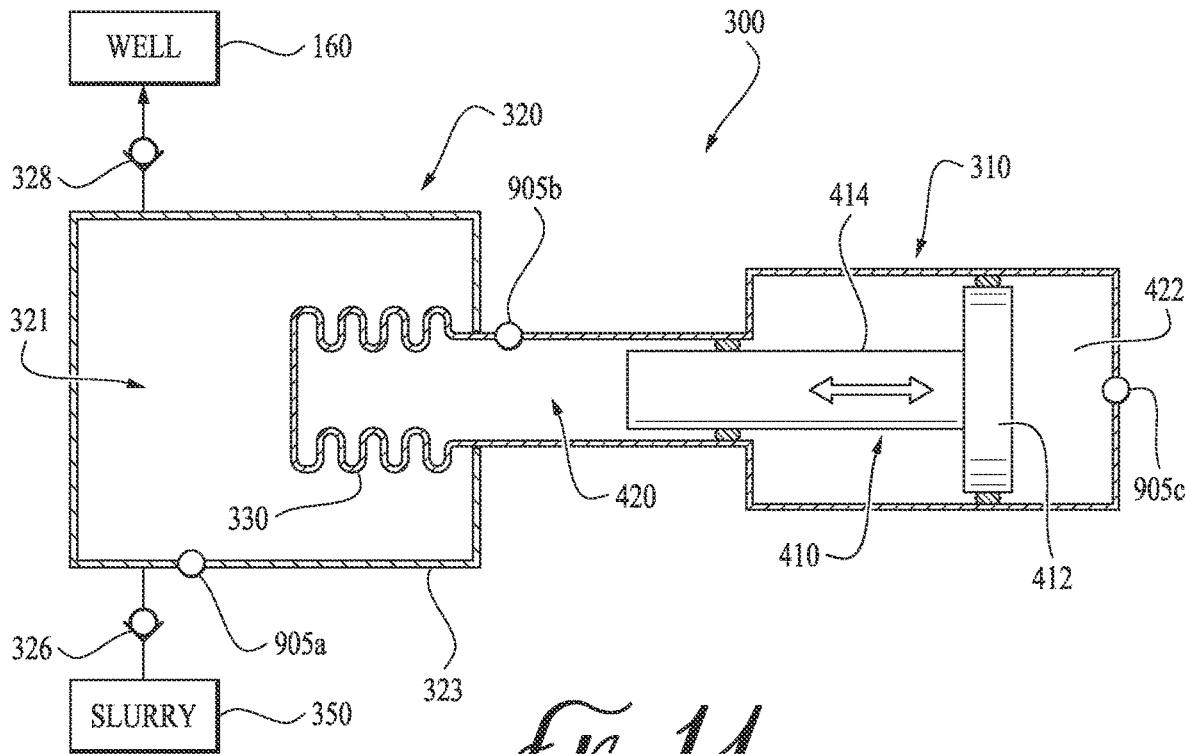
FIG. 14 is a schematic illustration of an exemplary bellows pump having one or more position sensor, according to an embodiment of the disclosure.

FIG. 14 provides a schematic illustration of a pump 300 similar to that discussed with respect to FIG. 11, but without the one or more pressure sensor and without the one or more strain sensor. Stated another way, the pump 300 of FIG. 14 may be similar to that of FIG. 9, but without the one or more strain sensor. Thus, the pump 300 embodiment shown in FIG. 14 may be configured with one or more sensor 905 detecting position (e.g. of one or more component of the pump 300) at one or more locations (e.g. at one or more of exemplary locations 1105a, b, c). The control system 490 may use the position data similar to the discussion with respect to FIG. 11 (e.g. to detect valve leakage, bellows leakage and/or out-of-sync). For example, a first position sensor 905a can be configured to detect the position of the bellows 330 (e.g. the amount of extension and/or the position of the far end of the bellows 330 away from the power end 310) and a second position sensor (e.g. 905b or 905c) can be configured to detect the position of the piston 40 (e.g. the amount of extension). By monitoring the difference (e.g. offset) between the position of the bellows 330 (e.g. with respect to the chamber 321) and the position of the piston 410 (e.g. the rod and/or head), e.g. by the control system 490, bellows health can be determined. For example, if the difference (e.g. offset) between the position of the bellows 330 and the position of the piston 410 (e.g. the rod/head) exceeds a corresponding threshold range, then there is potential leakage with respect to the bellows 330 (which could impact whether the bellows 330 is in sync with the piston 410).

Figure 15:
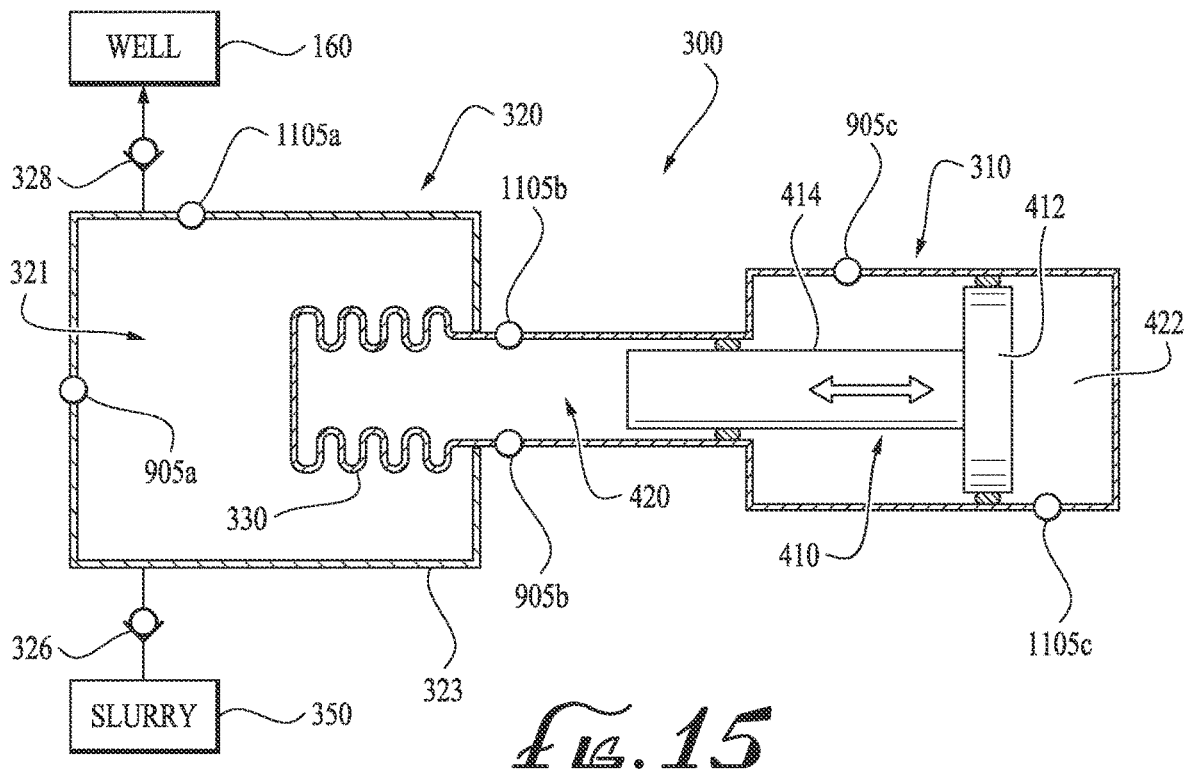
FIG. 15 is a schematic illustration of an exemplary bellows pump having one or more position sensor and one or more pressure sensor, according to an embodiment of the disclosure.

FIG. 15 provides a schematic illustration of a pump 300 similar to that discussed with respect to FIG. 11, but without the one or more strain sensor. Stated another way, the pump 300 of FIG. 15 may be similar to that of FIG. 14, but may also include one or more pressure sensor 1105. Thus, the pump 300 embodiment shown in FIG. 15 may be configured with one or more sensor 905 detecting position (e.g. of one or more component of the pump 300) at one or more locations (e.g. one or more of exemplary locations 905a, b, c) and one or more sensor 1105 detecting pressure at one or more locations (e.g. one or more of exemplary locations 1105a, b, c). The control system 490 may use the pressure data similar to the discussion with respect to FIG. 11 (e.g. to detect valve leakage). For example, the one or more pressure sensor 1105 can be disposed on (e.g. configured to measure pressure in) the chamber 321 of the fluid end 320 and/or the bore 420 of the power end 310 (e.g. with respect to the first portion 422 of the bore 420 and/or the second portion 424 of the bore 420). In embodiments, pressure decay from peak can be monitored (e.g. by the control system 490) as an indicator of discharge valve 328 health/leakage and/or pressure rise to peak can be monitored (e.g. by the control system 490) as an indicator of suction valve 326 health/leakage. Some pump 300 embodiments may include a plurality of pressure sensors 1105. For example, a first pressure sensor 1105a can be disposed on the fluid end 320 (e.g. in the chamber) 321 and a second pressure sensor (for example 1105b or 1105c) can be disposed on the power end 310 (e.g. in the bore 420). In some embodiments, offset between the first pressure sensor data and the second pressure sensor data can be monitored (e.g. by the control system 490).

Similarly, the control system 490 may use the position data similar to the discussion with respect to FIG. 11 (e.g. to detect valve or bellows leakage and/or out-of-sync). For example, a first position sensor 905a can be configured to detect the position of the bellows 330 (e.g. the amount of extension and/or the position of the far end of the bellows 330 away from the power end 310) and a second position sensor (e.g. 905b or 905c) can be configured to detect the position of the piston 410 (e.g. the amount of extension). By monitoring the difference (e.g. offset) between the position of the bellows 330 (e.g. with respect to the chamber 321) and the position of the piston 410 (e.g. the rod and/or head), e.g. by the control system 490, bellows health can be determined. For example, if the difference (e.g. offset) between the position of the bellows 330 and the position of the piston 410 (e.g. the rod/head) exceeds a corresponding threshold range, then there is potential leakage with respect to the bellows 330 (which could impact whether the bellows 330 is in sync with the piston 410).

Figure 16:
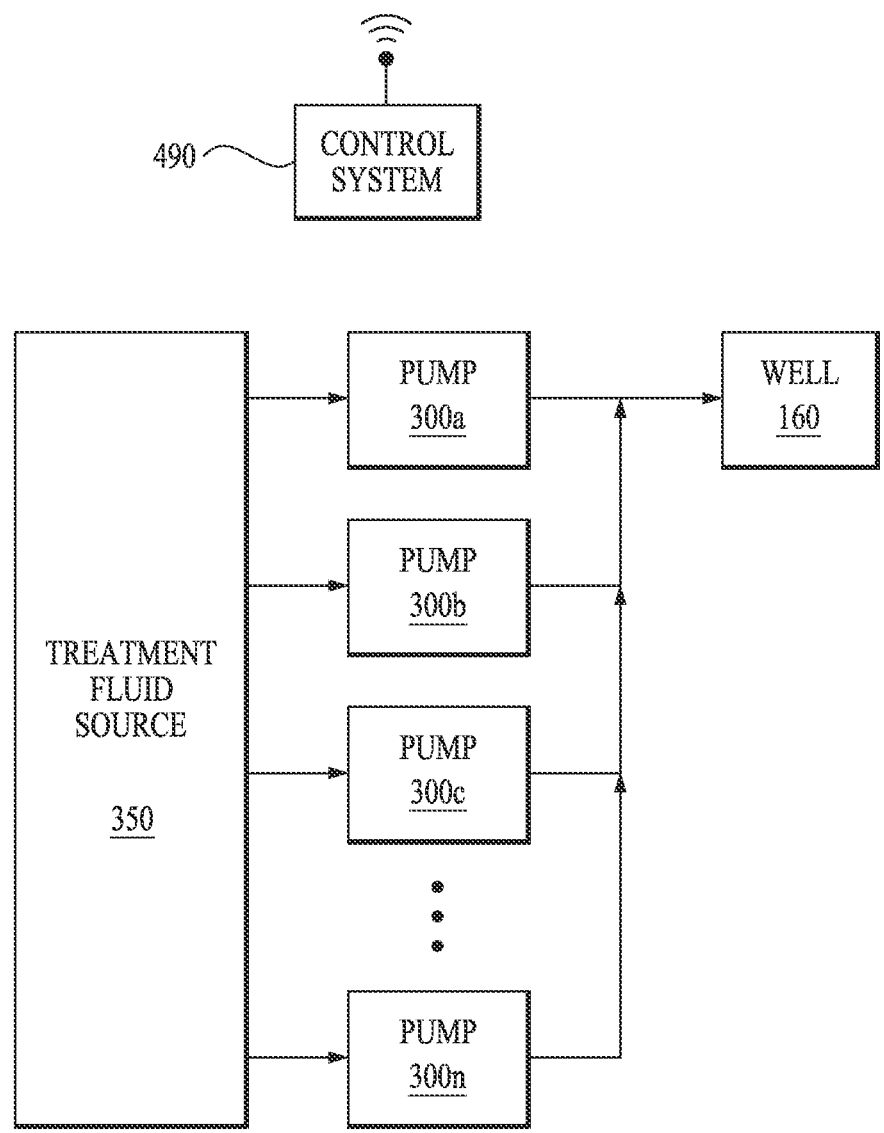
FIG. 16 is a schematic illustration of an exemplary system having a plurality of pumps configured to jointly pump fluid into a well.

FIG. 16 provides a schematic illustration of a system having multiple pumps (e.g. 300a-300n) configured to jointly pump treatment fluid into a well 160. In some embodiments, the plurality of pumps may be configured to provide constant pumping at approximately constant pressure. For example, one or more pump (e.g. 300a) may be configured so that its power stroke is out of sync with the power stroke of one or more other of the pumps (e.g. 300b). In some embodiments, half of the pumps may be configured to have their power/discharge strokes in sync, for example when the other half of the pumps are having their suction stroke. While FIG. 16 illustrates an embodiment in which all of the pumps draw from the same treatment fluid source 350, in other embodiments one or more of the pumps may draw from an independent fluid source.

Disclosed embodiments may provide a way to monitor valve and/or bellows health in real-time. The bellows pump 300 may comprise a fluid end housing/bellows housing 323 having a chamber 321 configured to contain the bellows 330, wherein the bellows 330 is used to provide fluid flow (e.g. through the chamber 321). For example, the suction valve 326 may be disposed upstream of the chamber 321 to allow incoming fluid flow, and the discharge valve 328 may be disposed downstream of the chamber 321 to discharge pressurized (e.g. treatment) fluid flow. While the suction valve 326 and the discharge valve 328 may each be one-way check valves, in alternate embodiments, any other suitable valve may be used as either the suction valve 326 and/or discharge valve 328. Although not required, as illustrated in FIGS. 7, 9, and 11-15, the bellows pump 300 may be coupled to a pressure intensifier (e.g. having a piston with head 412 larger than rod 414), which may be configured to increase the hydraulic pressure produced by the bellows pump 300. In embodiments, the pressure intensifier may be integrated into the bellows pump 300. It should be understood that various pump 300 embodiments discussed with respect to a piston and/or intensifier may be used without the piston and/or intensifier in other embodiments (e.g. with alternate means or mechanisms for reciprocally expanding and contracting the bellows), all of which are specifically included herein. For example, the one or more strain sensor, one or more position sensor, and/or one or more pressure sensor may be similarly used in exemplary bellows pump 300 embodiments which do not have a piston and/or intensifier, for example providing data to the control system 490 to monitor valve and/or bellows health. Additionally, any driver mechanism capable of reciprocally expanding and contracting the bellows may be used, and are included within the scope of this disclosure.

As discussed above, FIG. 9 illustrates suitable positions (705a, b, c) for the one or more strain gauges 705 and suitable positions (905a, b, c) for the one or more position sensors 905. As illustrated, there may be one or more strain gauges 705 disposed on the bellows housing/fluid end housing 323, on the portion of the housing for the power end 310 with the second portion of the bore 420 (e.g. associated with the rod 414 of the piston 410), on the pressure intensifier portion of the power end housing (e.g. with the first portion 422 of the bore 420 and/or associated with the head 412 of the piston 410), and any other suitable location. Likewise, there may be one or more position sensors 905 disposed on the bellows housing/fluid end housing 323 (e.g. within the chamber 321), on the portion of the housing for the power end 310 with the second portion 424 of the bore 420 (e.g. associated with the rod 414 of the piston 410) (e.g. within the second portion 424 of the bore 420), on the pressure intensifier portion of the power end 310 housing (e.g. in the first portion 422 of the bore 420), and any other suitable location. In embodiments, there may be a position sensor 905 disposed on the bellows 330 contained within the bellows housing/fluid end housing 323. The one or more strain gauges 705 and one or more position sensors 905 may measure parameters related to operation of the bellows pump 300 with reference to corresponding operation of associated valves (such as suction valve 326 and discharge valve 328). The position of the bellows 330 within the bellows housing/fluid end housing 323 in relation to the position of the piston 410 of the pressure intensifier may be correlated and monitored. The valve monitoring system (e.g. control system 490) may compare the position of the bellows 330 and piston 410 and create alerts and/or make physical adjustment (by way of actuated valves, such as suction valve 326, discharge valve 328, or other suitable valves) to the volume of power fluid providing the (e.g. fluid) coupling between the two in order to adjust the timing.

The relation of position of the bellows 330 and pressure intensifier (e.g. piston 410) may be used to determine leak of the bellows 330 by comparing expected position with actual position. For example, actual position may be determined based on the position sensor 905a associated with the fluid end 320, chamber 321, and/or bellows 330, while expected position may be determined based on the position sensor 905b or 905c associated with the power end 310, the bore, 420 and/or the piston 410. In certain embodiments, head position of a hydraulic motor(s) used to drive the pressure intensifier may be used to correlate its position. If the actual position does not follow the expected position, a determination may be made that there is leakage in the fluid coupling between the two.

FIG. 10 illustrates a graph showing a position signal 1010 generated by one of the position sensors 905 (for example, of FIG. 9) during operation of the bellows pump 300. In certain embodiments, the position signal 1010 may be shown on a display unit of the valve monitoring system. FIG. 10 shows a position signal 1010 displayed in volts over time (in seconds). The position signal 1010 may be generated by one of the position sensors 905 positioned on or with respect to the piston 410 of the pressure intensifier and/or positioned on or with respect to the bellows 330 contained within the bellows housing/fluid end housing 323. The position signal 1010 may represent the timing for opening and closing of a valve (such as suction valve 326, discharge valve 328, or other suitable valves) over the indicated time as the bellows 330 operate.

FIGS. 8A, 8B, and 8C each illustrates a graph of strain over time. FIG. 8A illustrates a strain signal 810 during ordinary operations as received by the valve monitoring system (e.g. the control system 490) for a healthy pump. FIG. 8B illustrates a strain signal 820 of an example of a discharge valve 328 leak which creates a longer strain decay over time for each strain cycle. FIG. 8C illustrates a strain signal 830 of an example of a suction valve 326 leak which creates a longer strain rise to peak. Referring to each of FIGS. 8A-8C, the example notations each represent key timing in valve opening/closing position. In one or more embodiments, the valve monitoring system (e.g. the control system 490) may receive and process signals from the one or more strain gauges 705 and one or more position sensors 905 to determine the opening and closing of the slurry valves (i.e., suction valve 326 and discharge valve 328), determine the position of the pressure intensifier (e.g., piston 410), and/or determine the position of the bellows 330 in the bellows housing/fluid end housing 323.

Using this information, the valve monitoring system (e.g. the control system 490) may determine the health of the slurry valves 326, 328 and/or bellows 330 and may relay the status to a display. In one or more embodiments, the valve monitoring system may display the processed signals in a graphical representation, such as strain signals 810, 820, and 830, generate and transmit an alert to a user or operator if there is leakage, actuate one or more valves, terminate operation of the bellows pump 300, or any combination thereof based on the received signals. In further embodiments, the received strain measurements and position measurements may be used to monitor other aspects of pump 300 performance beyond valve leakage. For example, and without limitation, such measurements may monitor for cavitation of the bellows pump 300, incomplete fill with the corresponding fluid at the fluid end 320, driver fluid leakage within the pressure intensifier (e.g. bore 420), and any combination thereof. As the valve monitoring system (e.g. the control system 490) may continuously monitor both strain and positions with respect to the bellows pump 300, the rate-of-change of either the strain, positions, or both may further be instructive of pump performance throughout both suction and discharge strokes.

Disclosed embodiments also comprise methods for monitoring valve and/or bellows health and/or for introducing treatment fluid into a well. Such methods may use any of the disclosed pump embodiments, such as the examples illustrated in FIGS. 7, 9, and 11-16. For example, a method embodiment may comprise: receiving (e.g. at a control system) strain data associate with the bellows pump (e.g. strain data for the fluid end housing and/or strain data for the power end housing); detecting valve leakage in the bellows pump based on the strain data; and responsive to detecting valve leakage, initiating action (e.g. by a controller), wherein leakage in a discharge valve of the bellows pump is detected based on (time for) strain decay from peak exceeding a first threshold, and leakage in a suction valve of the bellows pump is detected based on (time for) strain rise to peak exceeding a second threshold. Some embodiments may further comprise detecting strain in the bellows pump (e.g. at the fluid end and/or at the power end) (e.g. using one or more sensor—e.g. strain gauge) and sending strain data to the control system.

Some embodiments may further comprise pumping treatment fluid downhole in a well using the bellows pump. In some embodiments, the action may comprise sending an alert (e.g. with visual and/or audio display) and/or stopping pumping of treatment fluid (e.g. shutting down the driver and/or preventing movement of the bellows and/or the piston). In some embodiments, the action may include replacing the leaking valve which was detected. In some embodiments, the bellows pump may be one of a plurality of similar bellows pumps, and pumping treatment fluid may further comprise pumping with the plurality of bellows pumps. In some embodiments, the threshold(s) may be based on comparison of the strain data for the plurality of bellows pumps (e.g. if a pump is too far from the average). Some embodiments may further comprise (e.g. dynamically) setting the threshold(s) based on comparison of the strain data for the plurality of bellows pumps. Some embodiments may further comprise receiving (e.g. at the control system) position data associate with the bellows pump (e.g. position data for the bellows and/or position data for the piston), and correlating the position data and the strain data. For example, the position data may include data for both the bellows and the piston, and exemplary method embodiments may further comprise monitoring bellows health based on the amount of sync between the position of the bellows and the position of the piston (e.g, wherein out-of-sync movement is detected based on difference between the position of the bellows and the position of the piston (e.g. rod and/or head) extending beyond (e.g. +/−) a threshold range). Some embodiments may further comprise receiving (e.g. at the control system) pressure data associated with the bellows pump (e.g. pressure data for the chamber of the fluid end of the pump and/or pressure data for the bore of the power end of the pump), and correlating the pressure data with the strain data.

Disclosed embodiments may also include a method comprising: receiving position data (e.g. from at least two position sensors and/or at a control system) associate with the bellows pump (e.g. position data for the fluid end (e.g. the bellows in the chamber) and position data for the power end (e.g. the piston—the head and/or rod)); detecting (e.g. by the control system) out-of-sync movement in the bellows pump (e.g. based on the position data from the at least two position sensors in the pump and/or based on comparison of position data to similar pumps configured to jointly pump treatment fluid downhole in the well); and responsive to detecting out-of-sync movement, initiating action (e.g. by a controller), wherein out-of-sync movement is detected based on difference between the position of the bellows and the position of the piston (e.g. rod and/or head) extending beyond (e.g. +/−) a threshold range. In some embodiments, the threshold range is pre-set, while in other embodiments the threshold range can be based on comparison to (e.g. an average from) the plurality of pumps (e.g. action only initiated in the event that one of the plurality of pumps is more than a pre-set percentage from the mean of the plurality of pumps (e.g. too much position drift)). Some embodiments further comprise pumping treatment fluid downhole in a well using the bellows pump.

In some embodiments, the action may comprise sending an alert (e.g. with visual and/or audio display) and/or stopping pumping (e.g. shutting down the driver and/or preventing movement of the bellows and/or the piston) and/or using a make-up system to introduce or remove drive fluid between the piston and the bellows to provide synchronous movement of the bellows with the piston. In some embodiments, the action can be automated (e.g. by the control system). In some embodiments, the action may include replacing the bellows. Some embodiments may further comprise receiving (e.g. at the control system) pressure data associated with the bellows pump (e.g. pressure data for the chamber of the fluid end of the pump and/or pressure data for the bore of the power end of the pump), and correlating the pressure data with the position data.

Disclosed embodiments may also include a method comprising: receiving (e.g. at a control system) pressure data associate with the bellows pump (e.g. data for a chamber of a fluid end of the pump and/or pressure data for a bore of a power end of the pump); detecting valve leakage in the bellows pump based on the pressure data; and responsive to detecting valve leakage, initiating action (e.g. by a controller), wherein leakage in a discharge valve of the bellows pump is detected based on (time for) pressure decay from peak exceeding a first threshold, and leakage in a suction valve of the bellows pump is detected based on (time for) pressure rise to peak exceeding a second threshold. Some embodiments may further comprise detecting pressure in the bellows pump (e.g. at the fluid end and/or at the power end) (e.g. using one or more sensor—e.g. one or more pressure sensor) and sending pressure data to the control system. Some embodiments may further comprise pumping treatment fluid downhole in a well using the bellows pump.

In embodiments, the action may comprise sending an alert (e.g. with visual and/or audio display) and/or stopping pumping of treatment fluid (e.g. shutting down the driver and/or preventing movement of the bellows and/or the piston/plunger). In some embodiments, the action may include replacing the leaking valve. In embodiments, the bellows pump may be one of a plurality of similar bellows pumps, and pumping treatment fluid may further comprise pumping with the plurality of bellows pumps. In some embodiments, the threshold(s) may be based on comparison of the pressure data for the plurality of bellows pumps (e.g. if a pump is too far from the average). Some embodiments may further comprise (e.g. dynamically) setting the threshold(s) based on comparison of the pressure data for the plurality of bellows pumps.

Some embodiments may further comprise receiving (e.g. at the control system) position data associate with the bellows pump (e.g. position data for the bellows and/or position data for the piston), and correlating the position data and the pressure data. In some embodiments, the position data may comprise data for both the bellows and the piston, further comprising monitoring bellows health based on the amount of sync between the position of the bellows and the position of the piston. For example, out-of-sync movement may be detected based on difference between the position of the bellows and the position of the piston extending beyond a threshold range. Some embodiments may further comprise receiving (e.g. at the control system) strain data associated with the bellows pump (e.g. strain data for the fluid end of the pump and/or strain data for the power end of the pump), and correlating the pressure data with the strain data.

ADDITIONAL DISCLOSURE

The following are non-limiting, specific embodiments in accordance with the present disclosure:

In a first embodiment, a pump configured to provide/introduce treatment fluid to a well comprises: a power end; a fluid end having a fluid end housing with a chamber, a suction valve (e.g. in fluid communication with (e.g. fluidly coupled to) the chamber and a source for the treatment fluid and/or configured for introduction of treatment fluid into the chamber), and a discharge valve (e.g. in fluid communication with (e.g. fluidly coupled to) the chamber and the well and/or configured for injection of treatment fluid from the chamber into a well); an expandable bellows; one or more sensor configured to measure strain (e.g. strain gauge(s)) and/or pressure; and a control system configured to receive data from the one or more strain gauge and/or pressure sensor and to monitor for valve health.

A second embodiment can include the pump of the first embodiment, wherein the power end is (e.g. fluidly connected to and) configured to reciprocally expand/inflate and contract/deflate the bellows based on movement of drive fluid; and the bellows is configured to expand within the chamber of the fluid end based on movement of the drive fluid.

A third embodiment can include the pump of the first or second embodiments, wherein the suction valve is a one-way check valve configured to allow treatment fluid from the treatment fluid source to enter the chamber (e.g. during a suction stroke of the pump) (e.g. while preventing treatment fluid from exiting the chamber therethrough), and the discharge valve is a one-way check valve configured to allow treatment fluid to exit the chamber (e.g. towards the well) (e.g. during a power stroke of the pump) (e.g. while preventing treatment fluid from entering the chamber therethrough).

A fourth embodiment can include the pump of any one of the first to third embodiments, wherein the power end further comprises a piston configured to reciprocally move drive fluid (e.g. in and out of the bellows).

A fifth embodiment can include the pump of the fourth embodiment, wherein the power end further comprises a bore (e.g. in a power end housing) in fluid communication with the bellows (e.g. an internal volume of the bellows), and wherein the piston is disposed within the bore.

A sixth embodiment can include the pump of the fourth or fifth embodiments, wherein the piston is driven by a hydraulic circuit, a combustion engine, and/or an electric motor.

A seventh embodiment can include the pump of any one of the fourth to sixth embodiments, wherein the piston comprises a head and a rod (e.g. with the rod extending from the head and being disposed between the head and the bellows), with the rod having a smaller diameter than the head.

An eighth embodiment can include the pump of the seventh embodiment, wherein the piston is part of an intensifier configured to intensify applied pressure (e.g. from a driver) to the bellows (e.g. with the rod having a smaller diameter than the head, such as 1:1.1 to 1:10).

A ninth embodiment can include the pump of any one of the seventh to eighth embodiments, wherein the bore comprises a first portion with an inner diameter configured for movement of the head (axially) therethrough and a second portion with an inner diameter configured for movement of the rod (axially) therethrough.

A tenth embodiment can include the pump of the ninth embodiment, wherein the head is configured to sealingly move within the first portion of the bore (e.g. during pump strokes) and the rod is configured to sealingly move within the second portion of the bore (e.g. during pump strokes) (e.g. the power end further comprises a first seal configured to seal the head with respect to the first portion of the bore and a second seal configured to seal the rod with respect to the second portion of the bore) (wherein the first seal may be disposed on the head (e.g. a moving seal) or on the bore first portion inner surface (e.g. a stationary seal) and/or the second seal may be disposed on the rod (e.g. a moving seal) or on the bore second portion inner surface (a stationary seal)).

An eleventh embodiment can include the pump of the tenth embodiment, wherein the first seal is a moving seal (e.g. disposed on the head) and the second seal is a stationary seal (e.g. disposed on the inner surface/wall of the bore—e.g. within the bore second portion—which may in some embodiments comprises pump packing).

A twelfth embodiment can include the pump of any one of the first to eleventh embodiments, wherein the one or more sensor comprises one or more strain gauge.

A thirteenth embodiment can include the pump of the twelfth embodiment, wherein the one or more strain gauge is disposed in the fluid end and/or on (e.g. configured to measure strain in) the fluid end housing (e.g. in the chamber wall, a slurry valve housing, a suction valve housing, a discharge valve housing, a bellows housing, and/or a manifold member between the valve housing and the bellows) and/or the power end housing (e.g. with respect to the first portion of the bore and/or the second portion of the bore) (for example, in some embodiments one or more strain gauge may be externally mounted).

A fourteenth embodiment can include the pump of any one of the twelfth to thirteenth embodiments, wherein the control system comprises a monitor configured to visually display the data from the one or more strain gauge.

A fifteenth embodiment can include the pump of any one of the twelfth to fourteenth embodiments, wherein strain decay from peak is monitored (e.g. by the control system) (as an indicator of discharge valve health/leakage).

A sixteenth embodiment can include the pump of the fifteenth embodiment, wherein (the amount of time for) strain decay from peak exceeding a (e.g. first) threshold is indicative of a discharge valve leak.

A seventeenth embodiment can include the pump of the sixteenth embodiment, wherein the (e.g. first) threshold (e.g. relating to strain decay from peak) is pre-set (e.g. based on historic data).

An eighteenth embodiment can include the pump of any one of the fifteenth to seventeenth embodiments, wherein strain decay from peak may be based on the slope of strain versus time (e.g. the steepness of the slope and/or the rate of change of the slope).

A nineteenth embodiment can include the pump of any one of the twelfth to eighteenth embodiments, wherein strain rise to peak is monitored (e.g. by the control system) (as an indicator of suction valve health/leakage).

A twentieth embodiment can include the pump of the nineteenth embodiment, wherein (the amount of time for) strain rise to peak exceeding a (e.g. second) (e.g. pre-set) threshold is indicative of a suction valve leak.

A twenty-first embodiment can include the pump of the twentieth embodiment, wherein the (e.g. second) threshold (e.g. relating to strain rise to peak) is pre-set (e.g. based on historical data).

A twenty-second embodiment can include the pump of any one of the twentieth to twenty-first embodiments, wherein strain rise to peak may be based on the slope (e.g. the steepness of the slope and/or rate of change of the slope).

A twenty-third embodiment can include the pump of any one of the fifteenth to twenty-second embodiments, wherein the control system is configured to initiate an action in response to detecting a leak.

A twenty-forth embodiment can include the pump of the twenty-third embodiment, wherein the action comprises sending an alert (e.g. with visual and/or audio display, for example regarding replacement of one or more valve) and/or stopping pumping of treatment fluid (e.g. shutting down the driver and/or preventing movement of the bellows and/or the piston/plunger).

A twenty-fifth embodiment can include the pump of any one of the twelfth to twenty-fourth embodiments, wherein the one or more strain gauge comprises a plurality of strain gauges (for example with a first strain gauge disposed on the fluid end and a second strain gauge disposed on the power end), and wherein offset between the first strain gauge and the second strain gauge is monitored (e.g. by the control system), for example with the contrast in strain measurements being used to monitor intensification ratio indirectly in some embodiments.

A twenty-sixth embodiment can include a system comprising the pump of any one of the twelfth to twenty-fifth embodiments, wherein the pump is one of a plurality of similar pumps (e.g. configured to jointly pump fluid downhole in the well and/or jointly driven), wherein the (common) control system (e.g. for all of the plurality of pumps) compares strain data from the plurality of pumps and initiates action only in the event that one of the plurality of pumps is more than a pre-set percentage from the mean of the plurality of pumps (e.g. too much drift) (e.g. the threshold is set based on comparative data from the plurality of pumps).

A twenty-seventh embodiment can include the pump of any one of the first to twenty-sixth embodiments, further comprising one or more position sensor, wherein the controller is configured to correlate data from the one or more position sensor with data from the one or more strain gauge (e.g. overlay the position chart and the strain chart and/or use position data to check/match-up timing with the strain data).

A twenty-eighth embodiment can include the pump of the twenty-seventh embodiment, wherein the control system uses data from the one or more position sensor to interpret the data from the one or more strain gauge.

A twenty-ninth embodiment can include the pump of any one of the twenty-seventh to twenty-eighth embodiments, wherein offset between the data/chart of the one or more position sensor and the one or more strain gauge is monitored (e.g. by the control system) (for example, position and pressure may have a predictable relationship and timing, and when deviations are detected, it can be an indication of faulty valve action and/or incomplete-filling of the compression chamber).

A thirtieth embodiment can include the pump of any one of the twenty-seventh to twenty-ninth embodiments, wherein the one or more position sensor is disposed on the fluid end (e.g. within the chamber) (e.g. configured to detect position of the bellows in the chamber) and/or the power end (e.g. in the first portion of the bore and/or the second portion of the bore) (e.g. configured to detect the position of the piston—e.g. the head and/or the rod of the piston).

A thirty-first embodiment can include the pump of any one of the twenty-seventh to thirtieth embodiments, wherein the one or more position sensor comprises two position sensors, wherein a first of the two position sensors is configured to detect the position of the bellows and a second of the two position sensors is configured to detect the position of the piston—e.g. head and/or rod).

A thirty-second embodiment can include the pump of the thirty-first embodiment, wherein the second position sensor comprises a hydraulic motor head position sensor.

A thirty-third embodiment can include the pump of any one of the first to thirty-second embodiments, further comprising a first position sensor configured to detect the position of the bellows (e.g. the amount of extension and/or the position of the far end of the bellows away from the power end) and a second position sensor configured to detect the position of the piston (e.g. the amount of extension), wherein the control system is further configured to receive data from the first and second position sensors (and to monitor for bellows health).

A thirty-fourth embodiment can include the pump of the thirty-third embodiment, wherein the first position sensor is disposed in the chamber of the fluid end.

A thirty-fifth embodiment can include the pump of any one of the thirty-third to thirty-fourth embodiments, wherein the first position sensor is mounted opposite the bellows in the chamber and directed at the far end of the bellows (e.g. an optical eye and/or configured to measure distance between the sensor and the bellows).

A thirty-sixth embodiment can include the pump of any one of the thirty-third to thirty-fifth embodiments, wherein the second position sensor is disposed in the bore of the power end and/or in proximity to the piston.

A thirty-seventh embodiment can include the pump of any one of the thirty-third to thirty-sixth embodiments, wherein the second position sensor is disposed in proximity to the bellows (e.g. within the bore) and/or in the second portion of the bore and/or is disposed in proximity to the rod of the piston.

A thirty-eighth embodiment can include the pump of any one of the thirty-third to thirty-seventh embodiments, wherein the second position sensor is disposed in proximity to the head of the piston and/or is disposed in the first portion of the bore and/or is disposed with the head of the piston between the second position sensor and the bellows and is mounted opposite the head in the first portion of the bore and directed at the head.

A thirty-ninth embodiment can include the pump of any one of the thirty-third to thirty-eighth embodiments, wherein a difference (e.g. offset) between the position of the bellows (e.g. with respect to the chamber) and the position of the piston (e.g. the rod and/or head) (e.g. determining the position of the bellows relative to the position of the piston) is monitored (e.g. by the control system) (as an indicator of bellows health).

A fortieth embodiment can include the pump of the thirty-ninth embodiment, wherein the difference (e.g. offset) between the position of the bellows and the position of the piston (e.g. the rod/head) extending beyond (e.g. +/−) a threshold range is indicative of potential leakage with respect to the bellows (e.g. which could impact whether the bellows is in sync with the piston/plunger) and/or the bellows being out of sync with the piston/plunger.

A forty-first embodiment can include the pump of the fortieth embodiment, wherein the threshold (e.g. for the position offset) is pre-set (e.g. based on historical data).

A forty-second embodiment can include the pump of any one of the fortieth to forty-first embodiments, wherein the control system is configured to initiate an action in response to detecting a bellows leak and/or out of sync (e.g. the offset extending beyond the threshold).

A forty-third embodiment can include the pump of the forty-second embodiment, wherein the action comprises sending an alert (e.g. with visual and/or audio display) and/or stopping pumping of treatment fluid (e.g. shutting down the driver and/or preventing movement of the bellows and/or the piston/plunger) and/or automatically adjusting drive fluid between the bellows and the piston using a make-up system.

A forty-fourth embodiment can include a system having the pump of any one of the thirty-third to thirty-seventh embodiments, wherein the pump is one of a plurality of similar pumps (e.g. configured to jointly pump fluid downhole in the well and/or jointly driven), wherein the (common) control system (e.g. for all of the plurality of pumps) compares position data from the plurality of pumps and initiates action only in the event that one of the plurality of pumps is more than a pre-set percentage from the mean of the plurality of pumps (e.g. too much position drift) (e.g. the threshold range is set based on comparative data from the plurality of pumps).

A forty-fifth embodiment can include the pump of any one of the first to forty-fourth embodiments, wherein the pump comprises both one or more strain sensor and one or more position sensor, wherein the controller monitors for incomplete fill based on both strain and position data (e.g. if the piston is moving/extending (e.g. towards the bellows) and the strain is not rising to an expected level (e.g. based on comparison of multiple strain gauges, comparison of multiple pumps configured for joint pumping, and/or based on pre-set threshold (e.g. from historical data)).

A forty-sixth embodiment can include the pump of any one of the first to forty-fifth embodiments, wherein one or more pressure sensor may be used in place of or in conjunction with the one or more strain gauge (e.g. with a first pressure sensor configured to detect pressure in the chamber of the fluid end and/or a second pressure sensor configured to detect pressure in the power end (e.g. the first portion of the bore and/or the second portion of the bore).

A forty-seventh embodiment can include the pump of any one of the first to forty-fifth embodiments, further comprising one or more pressure sensor (e.g. with a first pressure sensor configured to detect pressure in the chamber of the fluid end and/or a second pressure sensor configured to detect pressure in the power end (e.g. the first portion of the bore and/or the second portion of the bore)).

A forty-eighth embodiment can include the pump of the forty-seventh embodiment, wherein the control system may be configured to correlate data from the one or more pressure sensor and data from the one or more strain gauge (e.g. using the one or more position sensor) (e.g, wherein the pressure decay from peak is monitored (e.g. by the control system— e.g. as an indicator of discharge valve health/leakage) (e.g. and may be compared to the strain decay from peak over the same time).

A forty-ninth embodiment can include the pump of the forty-eighth embodiment, wherein the (amount of time for) pressure decay from peak exceeding a threshold is indicative of a discharge valve leak.

A fiftieth embodiment can include the pump of the forty-ninth embodiment, wherein the threshold (e.g. for pressure decay from peak) is pre-set (e.g. based on historical data).

A fifty-first embodiment can include the pump of any one of the forty-eighth to fiftieth embodiments, wherein pressure decay from peak may be based on slope of pressure versus time (e.g. the steepness of the slope and/or the rate of change of the slope).

A fifty-second embodiment can include the pump of any one of the forty-eighth to fifty-first embodiments, wherein the pressure rise to peak is monitored (e.g. by the control system) (e.g. as an indicator of suction valve health/leakage).

A fifty-third embodiment can include the pump of the fifty-second embodiment, wherein (the amount of time for) pressure rise to peak exceeding a threshold is indicative of a suction valve leak.

A fifty-fourth embodiment can include the pump of the fifty-third embodiment, wherein the threshold (e.g. for pressure rise to peak) is pre-set (e.g. based on historical data).

A fifty-fifth embodiment can include the pump of any one of the fifty-second to fifty-fourth embodiments, wherein pressure rise to peak may be based on slope (e.g. of pressure over time) (e.g. the steepness and/or rate of change of the slope).

A fifty-sixth embodiment can include the pump of any one of the first to fifty-fifth embodiments, wherein the one or more sensor is configured to measure pressure (e.g. one or more pressure sensor).

A fifty-seventh embodiment can include the pump of the fifty-sixth embodiment, wherein the one or more pressure sensor is disposed on (e.g. configured to measure pressure in) the chamber of the fluid end and/or the bore of the power end (e.g. with respect to the first portion of the bore and/or the second portion of the bore).

A fifty-eighth embodiment can include the pump of any one of the fifty-sixth to fifty-seventh embodiments, wherein the control system comprises a monitor configured to visually display the data from the one or more pressure sensor.

A fifty-ninth embodiment can include the pump of any one of the fifty-sixth to fifty-eighth embodiments, wherein pressure decay from peak is monitored (e.g. by the control system) (as an indicator of discharge valve health/leakage).

A sixtieth embodiment can include the pump of the fifty-ninth embodiment, wherein (the amount of time for) pressure decay from peak exceeding a (pre-set) threshold is indicative of a discharge valve leak.

A sixty-first embodiment can include the pump of the sixtieth embodiment, wherein the threshold (e.g. for pressure decay from peak) is pre-set (e.g. based on historical data).

A sixty-second embodiment can include the pump of the fifty-ninth to sixty-first embodiments, wherein pressure decay from peak may be based on the slope of pressure versus time (e.g. the steepness and/or the rate of change of the slope).

A sixty-third embodiment can include the pump of any one of the fifty-sixth to sixty-second embodiments, wherein pressure rise to peak is monitored (e.g. by the control system) (e.g. as an indicator of suction valve health/leakage).

A sixty-fourth embodiment can include the pump of the sixty-third embodiment, wherein (the amount of time for) pressure rise to peak exceeding a threshold is indicative of a suction valve leak and/or too fast of a rise to peak pressure (e.g. exceeding a corresponding threshold) can be indicative of a discharge valve that is leaking backwards.

A sixty-fifth embodiment can include the pump of the sixty-fourth embodiment, wherein the threshold (e.g. for pressure rise to peak) is pre-set (e.g. based on historical data).

A sixty-sixth embodiment can include the pump of any one of the sixty-third to sixty-fifth embodiments, wherein pressure rise to peak may be based on the slope of pressure versus time (e.g. the steepness and/or rate of change of the slope).

A sixty-seventh embodiment can include the pump of any one of the fifty-ninth to sixty-sixth embodiments, wherein the control system is configured to initiate an action in response to detecting a leak.

A sixty-eighth embodiment can include the pump of the sixty-seventh embodiment, wherein the action comprises sending an alert (e.g. with visual and/or audio display, for example regarding replacement of one or more valve) and/or stopping pumping of treatment fluid (e.g. shutting down the driver and/or preventing movement of the bellows and/or the piston/plunger).

A sixty-ninth embodiment can include the pump of any one of the fifty-sixth to sixty-eighth embodiments, wherein the one or more pressure sensor comprises a plurality of pressure sensors (for example with a first pressure sensor disposed on the fluid end (e.g. in the chamber) and a second pressure sensor disposed on the power end (e.g. in the bore)), and wherein offset between the first pressure sensor data and the second pressure sensor data is monitored (e.g. by the control system) (for example, for use similar to that of two strain gauges above, such as directly indicating effective intensification ratio, helping to reveal drag or hydraulic resistance in the system, and/or helping to reveal an over-extended bellows and/or a bellows that may be hindered by debris).

A seventieth embodiment can include a system having the pump of any one of the fifty-sixth to sixty-ninth embodiments, wherein the pump is one of a plurality of similar pumps (e.g. configured to jointly pump fluid downhole in the well and/or jointly driven), wherein the (common) control system (e.g. for all of the plurality of pumps) compares pressure sensor data from the plurality of pumps and initiates action only in the event that one of the plurality of pumps is more than a pre-set percentage from the mean of the plurality of pumps (e.g. too much drift) (e.g. the threshold is set based on comparative data from the plurality of pumps).

In a seventy-first embodiment, a pump configured to provide treatment fluid to a well comprises: a power end; a fluid end having a fluid end housing with a chamber, a suction valve (e.g. in fluid communication with (e.g. fluidly coupled to) the chamber and a source for the treatment fluid and/or configured for introduction of treatment fluid into the chamber), and a discharge valve (e.g. in fluid communication with (e.g. fluidly coupled to) the chamber and the well and/or configured for injection of treatment fluid from the chamber into a well); an expandable bellows; at least two sensors configured to measure position, wherein a first position sensor measures the position of the bellows and a second position sensor measures the position of the piston; and a control system configured to receive data from the at least two sensors and to monitor for bellows health; wherein the power end is (fluidly connected to and) configured to reciprocally expand/inflate and contract/deflate the bellows based on movement of power/drive fluid; and the bellows is configured to expand within the chamber of the fluid end based on movement of the power/drive fluid.

A seventy-second embodiment can include the pump of the seventy-first embodiment, wherein the first position sensor is configured to detect the position of the bellows (e.g. the amount of extension and/or the position of the far end of the bellows away from the power end) and the second position sensor configured to detect the position of the piston (e.g. the amount of extension).

A seventy-third embodiment can include the pump of any one of the seventy-first to seventy-second embodiments, wherein the second position sensor comprises a hydraulic motor head position sensor.

A seventy-fourth embodiment can include the pump of any one of the seventy-first to seventy-third embodiments, wherein the first position sensor is disposed in the chamber of the fluid end.

A seventy-fifth embodiment can include the pump of any one of the seventy-first to seventy-fourth embodiments, wherein the first position sensor is mounted opposite the bellows in the chamber and directed at the far end of the bellows (e.g. measures distance between the sensor and the bellows).

A seventy-sixth embodiment can include the pump of any one of the seventy-first to seventy-fifth embodiments, wherein the second position sensor is disposed in the bore of the power end and/or in proximity to the piston.

A seventy-seventh embodiment can include the pump of the seventy-sixth embodiment, wherein the second position sensor is disposed in proximity to the bellows (e.g. within the bore) and/or in the second portion of the bore and/or is disposed in proximity to the rod of the piston.

A seventy-eighth embodiment can include the pump of the seventy-sixth embodiment, wherein the second position sensor is disposed in proximity to the head of the piston and/or is disposed in the first portion of the bore and/or is disposed with the head of the piston between the second position sensor and the bellows and is mounted opposite the head in the first portion of the bore and directed at the head.

A seventy-ninth embodiment can include the pump of any one of the seventy-first to seventy-eight embodiments, wherein a difference (e.g. offset) between the position of the bellows (e.g. with respect to the chamber) and the position of the piston (e.g. the rod and/or head) (e.g. the positional difference of the bellows relative to the piston) is monitored (e.g. by the control system) (e.g. as an indicator of bellows health).

An eightieth embodiment can include the pump of the seventy-ninth embodiments, wherein the difference (e.g. offset) between the position of the bellows and the position of the piston (e.g. the rod/head) extending beyond (e.g. +/−) a threshold range is indicative of potential leakage with respect to the bellows (which could impact whether the bellows is in sync with the piston/plunger) and/or the bellows being out of sync with the piston/plunger.

An eighty-first embodiment can include the pump of the eightieth embodiment, wherein the threshold (e.g. of positional difference) is pre-set (e.g. based on historical data).

An eighty-second embodiment can include the pump of any one of the seventy-ninth to eighty-first embodiments, wherein the control system is configured to initiate an action in response to detecting a bellows leak and/or out of sync (e.g. the offset extending beyond the threshold).

An eighty-third embodiment can include the pump of the eighty-second embodiment, wherein the action comprises sending an alert (e.g. with visual and/or audio display) and/or stopping pumping of treatment fluid (e.g. shutting down the driver and/or preventing movement of the bellows and/or the piston/plunger) and/or automatically engaging a make-up system (e.g. to manage drive fluid between the bellows and the piston to address any offset).

An eighty-fourth embodiment can include the pump of any one of the seventy-first to eighty-third embodiments, further comprising one or more sensor configured to measure pressure (e.g. one or more pressure sensor).

An eighty-fifth embodiment can include the pump of the eighty-fourth embodiment, wherein the one or more pressure sensor is disposed on (e.g. configured to measure pressure in) the chamber of the fluid end and/or the bore of the power end (e.g. with respect to the first portion of the bore and/or the second portion of the bore).

An eighty-sixth embodiment can include the pump of any one of the eighty-fourth to eighty-fifth embodiments, wherein the control system comprises a monitor configured to visually display the data from the one or more pressure sensor.

An eighty-seventh embodiment can include the pump of any one of the eighty-fourth to eighty-sixth embodiments, wherein pressure decay from peak is monitored (e.g. by the control system) (e.g. as an indicator of discharge valve health/leakage).

An eighty-eighth embodiment can include the pump of the eighty-seventh embodiment, wherein (the amount of time for) pressure decay from peak exceeding a threshold is indicative of a discharge valve leak.

An eighty-ninth embodiment can include the pump of the eighty-eighth embodiment, wherein the threshold (e.g. for pressure decay from peak) is pre-set (e.g. based on historical data).

A ninetieth embodiment can include the pump of any one of the eighty-seventh to eighty-ninth embodiments, wherein pressure decay from peak may be based on the slope of pressure versus time (e.g. the steepness and/or the rate of change of the slope).

A ninety-first embodiment can include the pump of any one of the eighty-fourth to ninetieth embodiments, wherein pressure rise to peak is monitored (e.g. by the control system) (as an indicator of suction valve health/leakage).

A ninety-second embodiment can include the pump of the ninety-first embodiment, wherein (the amount of time for) pressure rise to peak exceeding a threshold is indicative of a suction valve leak.

A ninety-third embodiment can include the pump of the ninety-second embodiment, wherein the threshold (e.g. for pressure rise to peak) is pre-set (e.g. based on historical data).

A ninety-fourth embodiment can include the pump of any one of the ninety-first to ninety-third embodiments, wherein pressure rise to peak may be based on the slope (e.g. rate of change of the slope).

A ninety-fifth embodiment can include the pump of any one of the eighty-seventh to ninety-fourth embodiments, wherein the control system is configured to initiate an action in response to detecting a leak.

A ninety-sixth embodiment can include the pump the ninety-fifth embodiment, wherein the action comprises sending an alert (e.g. with visual and/or audio display) and/or stopping pumping of treatment fluid (e.g. shutting down the driver and/or preventing movement of the bellows and/or the piston/plunger).

A ninety-seventh embodiment can include the pump of any one of the eighty-fourth to ninety-sixth embodiments, wherein the one or more pressure sensor comprises a plurality of pressure sensors (for example with a first pressure sensor disposed on the fluid end (e.g. in the chamber) and a second pressure sensor disposed on the power end (e.g. in the bore)), and wherein offset between the first pressure sensor data and the second pressure sensor data is monitored (e.g. by the control system) (for example, for use similar to that of two strain gauges above, such as directly indicating effective intensification ratio, helping to reveal drag or hydraulic resistance in the system, and/or helping to reveal an over-extended bellows and/or a bellows that may be hindered by debris).

A ninety-eighth embodiment can include a system comprising the pump of any one of the eighty-fourth to ninety-seventh embodiments, wherein the pump is one of a plurality of similar pumps (e.g. configured to jointly pump fluid downhole in the well and/or jointly driven), wherein the (common) control system (e.g. for all of the plurality of pumps) compares pressure sensor data from the plurality of pumps and initiates action only in the event that one of the plurality of pumps is more than a pre-set percentage from the mean of the plurality of pumps (e.g. too much drift) (e.g. the threshold is set based on comparative data from the plurality of pumps).

In a ninety-ninth embodiment, a method of monitoring valve health in a bellows pump (e.g. for introducing fluid into a well), comprises: receiving (e.g. at a control system) strain data associate with the bellows pump (e.g. strain data for the fluid end housing and/or strain data for the power end housing); detecting valve leakage in the bellows pump based on the strain data; and responsive to detecting valve leakage, initiating action (e.g. by a controller), wherein leakage in a discharge valve of the bellows pump is detected based on (time for) strain decay from peak exceeding a first threshold, and leakage in a suction valve of the bellows pump is detected based on (time for) strain rise to peak exceeding a second threshold.

A one hundredth embodiment can include the method of the ninety-ninth embodiment, further comprising detecting strain in the bellows pump (e.g. at the fluid end and/or at the power end) (e.g. using one or more sensor—e.g. strain gauge) and sending strain data to the control system.

A one hundred first embodiment can include the method of any one of the ninety-ninth to one hundredth embodiments, wherein the threshold(s) may be pre-set.

A one hundred second embodiment can include the method of any one of the ninety-ninth to one hundred first embodiments, wherein the threshold(s) may be based on slope (e.g. steepness and/or rate of change of slope).

A one hundred third embodiment can include the method of any one of the ninety-ninth to one hundred second embodiments, wherein the first threshold and the second threshold may be the same or different (e.g. the same amount of time, or different amounts of time).

A one hundred fourth embodiment can include the method of any one of the ninety-ninth to one hundred third embodiments, further comprising pumping treatment fluid downhole in a well using the bellows pump.

A one hundred fifth embodiment can include the method of any one of the ninety-ninth to one hundred fourth embodiments, wherein the action comprises sending an alert (e.g. with visual and/or audio display) and/or stopping pumping of treatment fluid (e.g. shutting down the driver and/or preventing movement of the bellows and/or the piston/plunger).

A one hundred sixth embodiment can include the method of any one of the one hundred fourth to one hundred fifth embodiments, wherein the bellows pump is one of a plurality of similar bellows pumps, and pumping treatment fluid further comprises pumping with the plurality of bellows pumps.

A one hundred seventh embodiment can include the method of the one hundred sixth embodiments, wherein the threshold(s) may be based on comparison of the strain data for the plurality of bellows pumps (e.g. if a pump is too far from the average) (setting the threshold(s) based on comparison of the strain data for the plurality of bellows pumps).

A one hundred eighth embodiment can include the method of any one of the ninety-ninth to one hundred seventh embodiments, further comprising receiving (e.g. at the control system) position data associate with the bellows pump (e.g. position data for the bellows and/or position data for the piston), and correlating the position data and the strain data.

A one hundred ninth embodiment can include the method of the one hundred eighth embodiment, wherein the position data comprises data for both the bellows and the piston, further comprising monitoring bellows health based on the amount of sync between the position of the bellows and the position of the piston (e.g, wherein out-of-sync movement is detected based on difference between the position of the bellows and the position of the piston (e.g. rod and/or head) extending beyond (e.g. +/−) a threshold range).

A one hundred tenth embodiment can include the method of any one of the ninety-ninth to one hundred eighth embodiments, further comprising receiving (e.g. at the control system) pressure data associated with the bellows pump (e.g. pressure data for the chamber of the fluid end of the pump and/or pressure data for the bore of the power end of the pump), and correlating the pressure data with the strain data.

In a one hundred eleventh embodiment, a method of monitoring bellows health in a bellows pump, comprising: receiving position data (e.g. from at least two position sensors and/or at a control system) associate with the bellows pump (e.g. position data for the fluid end (e.g. the bellows in the chamber) and position data for the power end (e.g. the piston—the head and/or rod)); detecting (e.g. by the control system) out-of-sync movement in the bellows pump (e.g. based on the position data from the at least two position sensors in the pump and/or based on comparison of position data to similar pumps configured to jointly pump treatment fluid downhole in the well); and responsive to detecting out-of-sync movement, initiating action (e.g. by a controller), wherein out-of-sync movement is detected based on difference between the position of the bellows and the position of the piston (e.g. rod and/or head) extending beyond (e.g. +/−) a threshold range.

A one hundred twelfth embodiment can include the method of the one hundred eleventh embodiment, wherein the threshold range is pre-set.

A one hundred thirteenth embodiment can include the method of the one hundred eleventh embodiment, wherein the threshold range is based on comparison to (e.g. an average from) the plurality of pumps (e.g. action only initiated in the event that one of the plurality of pumps is more than a pre-set percentage from the mean of the plurality of pumps (e.g. too much position drift)).

A one hundred fourteenth embodiment can include the method of any one of the one hundred eleventh to one hundred thirteenth embodiments, further comprising pumping treatment fluid downhole in a well using the bellows pump.

A one hundred fifteenth embodiment can include the method of any one of the one hundred eleventh to one hundred fourteenth embodiments, wherein the action comprises sending an alert (e.g. with visual and/or audio display) and/or stopping pumping (e.g. shutting down the driver and/or preventing movement of the bellows and/or the piston/plunger) and/or using a make-up system to introduce or remove drive fluid between the piston and the bellows to provide synchronous movement of the bellows with the piston.

A one hundred sixteenth embodiment can include the method of any one of the one hundred eleventh to one hundred fifteenth embodiments, further comprising receiving (e.g. at the control system) pressure data associated with the bellows pump (e.g. pressure data for the chamber of the fluid end of the pump and/or pressure data for the bore of the power end of the pump), and correlating the pressure data with the position data.

In a one hundred seventeenth embodiment, a method of monitoring valve health in a bellows pump (e.g. for introducing fluid into a well), comprising: receiving (e.g. at a control system) pressure data associate with the bellows pump (e.g. data for a chamber of a fluid end of the pump and/or pressure data for a bore of a power end of the pump); detecting valve leakage in the bellows pump based on the pressure data; and responsive to detecting valve leakage, initiating action (e.g. by a controller), wherein leakage in a discharge valve of the bellows pump is detected based on (time for) pressure decay from peak exceeding a first threshold, and leakage in a suction valve of the bellows pump is detected based on (time for) pressure rise to peak exceeding a second threshold.

A one hundred eighteenth embodiment can include the method of the one hundred seventeenth embodiment, further comprising detecting pressure in the bellows pump (e.g. at the fluid end and/or at the power end) (e.g. using one or more sensor—e.g. one or more pressure sensor) and sending pressure data to the control system.

A one hundred nineteenth embodiment can include the method of any one of the one hundred seventeenth to one hundred eighteenth embodiments, wherein the threshold(s) may be pre-set.

A one hundred twentieth embodiment can include the method of any one of the one hundred seventeenth to one hundred eighteenth embodiments, wherein the threshold(s) may be based on slope (e.g. rate of change of slope).

A one hundred twenty-first embodiment can include the method of any one of the one hundred seventeenth to one hundred twentieth embodiments, wherein the first threshold and the second threshold may be the same or different (e.g. the same amount of time, or different amounts of time).

A one hundred twenty-second embodiment can include the method of any one of the one hundred seventeenth to one hundred twenty-first embodiments, further comprising pumping treatment fluid downhole in a well using the bellows pump.

A one hundred twenty-third embodiment can include the method of any one of the one hundred seventeenth to one hundred twenty-second embodiments, wherein the action comprises sending an alert (e.g. with visual and/or audio display) and/or stopping pumping of treatment fluid (e.g. shutting down the driver and/or preventing movement of the bellows and/or the piston/plunger).

A one hundred twenty-fourth embodiment can include the method of any one of the one hundred seventeenth to one hundred twenty-third embodiments, wherein the bellows pump is one of a plurality of similar bellows pumps, and pumping treatment fluid further comprises pumping with the plurality of bellows pumps, wherein the threshold(s) may be based on comparison of the pressure data for the plurality of bellows pumps (e.g. if a pump is too far from the average) (setting the threshold(s) based on comparison of the pressure data for the plurality of bellows pumps).

A one hundred twenty-fifth embodiment can include the method of any one of the one hundred seventeenth to one hundred twenty-fourth embodiments, further comprising receiving (e.g. at the control system) position data associate with the bellows pump (e.g. position data for the bellows and/or position data for the piston), and correlating the position data and the pressure data.

A one hundred twenty-sixth embodiment can include the method of the one hundred twenty-fifth embodiment, wherein the position data comprises data for both the bellows and the piston, further comprising monitoring bellows health based on the amount of sync between the position of the bellows and the position of the piston (e.g, wherein out-of-sync movement is detected based on difference between the position of the bellows and the position of the piston (e.g. rod and/or head) extending beyond (e.g. +/−) a threshold range).

A one hundred twenty-seventh embodiment can include the method of any one of the one hundred seventeenth to one hundred twenty-seventh embodiments, further comprising receiving (e.g. at the control system) strain data associated with the bellows pump (e.g. strain data for the fluid end of the pump and/or strain data for the power end of the pump), and correlating the pressure data with the strain data.

A one hundred twenty-eighth embodiment can include the method of any one of the ninety-ninth to one hundred twenty-seventh embodiments, wherein the bellows pump comprises any one of the pumps selected from the first to first to ninety-eighth embodiments.

In a one hundred twenty-ninth embodiment, a system for pumping treatment fluid into a well, comprising: a pump; a treatment fluid source; and a control system, wherein the pump comprises any one of the pumps selected from the first to ninety-eighth embodiments.

A one hundred thirtieth embodiment can include the system of the one hundred twenty-ninth embodiment, configured to carry out the method of any one of the ninety-ninth to one hundred twenty-eighth embodiments.

In a one hundred thirty-first embodiment, a programmable storage device having program instructions stored thereon for causing a processor to perform the method according to any one of the ninety-ninth to one hundred twenty-eighth embodiments.

In a one hundred thirty-second embodiment, a non-transitory computer-readable medium having program instructions stored thereon for causing a control system to perform the method of any one of the ninety-ninth to one hundred twenty-eighth embodiments.

While embodiments have been shown and described, modifications thereof can be made by one skilled in the art without departing from the spirit and teachings of this disclosure. The embodiments described herein are exemplary only, and are not intended to be limiting. Many variations and modifications of the embodiments disclosed herein are possible and are within the scope of this disclosure. For example, the various elements or components may be combined or integrated in another system or certain features may be omitted or not implemented. Also, techniques, systems, subsystems, and methods described and illustrated in the various embodiments as discrete or separate may be combined or integrated with other techniques, systems, subsystems, or methods without departing from the scope of this disclosure. Other items shown or discussed as directly coupled or connected or communicating with each other may be indirectly coupled, connected, or communicated with. Method or process steps set forth may be performed in a different order. The use of terms, such as "first," "second," "third" or "fourth" to describe various processes or structures is only used as a shorthand reference to such steps/structures and does not necessarily imply that such steps/structures are performed/formed in that ordered sequence (unless such requirement is clearly stated explicitly in the specification).

Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, Rl, and an upper limit, Ru, is disclosed, any number falling within the range is specifically disclosed. In particular, the following numbers within the range are specifically disclosed: $R=Rl+k*(Ru-Rl)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . 95 percent, 96 percent, 97 percent, 98 percent, 99 percent, or 100 percent. Moreover, any numerical range defined by two R numbers as defined in the above is also specifically disclosed. Language of degree used herein, such as "approximately," "about," "generally," and "substantially," represent a value, amount, or characteristic close to the stated value, amount, or characteristic that still performs a desired function or achieves a desired result. For example, the language of degree may mean a range of values as understood by a person of skill or, otherwise, an amount that is +/−10%.

Use of broader terms such as comprises, includes, having, etc. should be understood to provide support for narrower terms such as consisting of, consisting essentially of, comprised substantially of, etc. When a feature is described as "optional," both embodiments with this feature and embodiments without this feature are disclosed. Similarly, the present disclosure contemplates embodiments where this "optional" feature is required and embodiments where this feature is specifically excluded. The use of the terms such as "high-pressure" and "low-pressure" is intended to only be descriptive of the component and their position within the systems disclosed herein. That is, the use of such terms should not be understood to imply that there is a specific operating pressure or pressure rating for such components. For example, the term "high-pressure" describing a manifold should be understood to refer to a manifold that receives pressurized fluid that has been discharged from a pump irrespective of the actual pressure of the fluid as it leaves the pump or enters the manifold. Similarly, the term "low-pressure" describing a manifold should be understood to refer to a manifold that receives fluid and supplies that fluid to the suction side of the pump irrespective of the actual pressure of the fluid within the low-pressure manifold.

Accordingly, the scope of protection is not limited by the description set out above but is only limited by the claims which follow, that scope including all equivalents of the subject matter of the claims. Each and every claim is incorporated into the specification as embodiments of the present disclosure. Thus, the claims are a further description and are an addition to the embodiments of the present disclosure. The discussion of a reference herein is not an admission that it is prior art, especially any reference that can have a publication date after the priority date of this application. The disclosures of all patents, patent applications, and publications cited herein are hereby incorporated by reference, to the extent that they provide exemplary, procedural, or other details supplementary to those set forth herein.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

As used herein, the term "or" is inclusive unless otherwise explicitly noted. Thus, the phrase "at least one of A, B, or C" is satisfied by any element from the set {A, B, C} or any combination thereof, including multiples of any element.

As used herein, the term "and/or" includes any combination of the elements associated with the "and/or" term. Thus, the phrase "A, B, and/or C" includes any of A alone, B alone, C alone, A and B together, B and C together, A and C together, or A, B, and C together.

What is claimed is:

1. A pump configured to introduce treatment fluid into a well, comprising:
a power end;
a fluid end having a fluid end housing with a chamber, a suction valve, and a discharge valve;
an expandable bellows in fluid communication with the power end;
one or more strain gauge configured to measure strain in the pump; and
a control system configured to receive data from the one or more strain gauge and to monitor for valve health;
wherein:
the control system is configured to use the data from the one or more strain gauge to monitor strain decay from peak and to detect leakage of the discharge valve based on a time for strain decay from peak exceeding a first threshold;
the control system is configured to use the data from the one or more strain gauge to monitor strain rise to peak and to detect leakage of the suction valve based on a time for strain rise to peak exceeding a second threshold; and
the control system is configured to initiate an action in response to detecting leakage of either the discharge valve or the suction valve.

2. The pump of claim 1, wherein the one or more strain gauge is disposed on the power end.

3. The pump of claim 2, wherein the control system comprises a monitor configured to visually display the data from the one or more strain gauge.

4. A system comprising the pump of claim 1, wherein the pump is one of a plurality of similar pumps configured to jointly pump fluid downhole in the well, wherein the second threshold is based on comparative data from the plurality of pumps.

5. The pump of claim 1, further comprising one or more position sensor, wherein the controller is configured to correlate data from the one or more position sensor with data from the one or more strain gauge.

6. The pump of claim 5, wherein the control system comprises a monitor configured to visually display the data from the one or more strain gauge and the one or more position sensor, overlaying a position chart and a strain chart.

7. The pump of claim 5, wherein the power end comprises a piston disposed in a bore, wherein the one or more position sensor comprises two position sensors, wherein a first of the two position sensors is configured to detect position of the bellows and a second of the two position sensors is configured to detect position of the piston, and wherein a difference between position of the bellows and position of the piston is monitored by the control system using data from the two position sensors to determine whether the bellows is in sync with the piston.

8. The pump of claim 7, further comprising one or more pressure sensor configured to detect pressure in the chamber of the fluid end and/or in the bore of the power end, wherein the control system may be configured to correlate data from the one or more pressure sensor and data from the one or more strain gauge.

9. The pump of claim 8, wherein pressure decay from peak is monitored by the control system, pressure rise to peak is monitored by the control system, and the control system is configured to verify leakage detected from the strain gauge data using the pressure sensor data.

10. The pump of claim 5, wherein the pump is one of a plurality of similar pumps configured to jointly pump fluid downhole in the well, wherein the control system compares position data from the plurality of pumps and initiates action only in the event that position data of one of the plurality of pumps is more than a pre-set percentage from a mean of the plurality of pumps.

11. The pump of claim 1, further comprising one or more pressure sensor configured to detect pressure in the chamber of the fluid end and/or in a bore of the power end, wherein the control system may be configured to correlate data from the one or more pressure sensor and data from the one or more strain gauge.

12. The pump of claim 1, wherein the action comprises sending an alert regarding replacement of either the suction valve or the discharge valve based on detected leakage.

13. The pump of claim 1, wherein the action comprises stopping pumping of treatment fluid.

14. The pump of claim 1, wherein the power end further comprises a piston configured to reciprocally move drive fluid in and out of the bellows, wherein the piston is in fluid communication with the bellows.

15. The pump of claim 1, wherein strain decay from peak is based on a slope of strain versus time, and wherein strain rise to peak is based on the slope of strain versus time.

16. The pump of claim 1, wherein the one or more strain gauge is disposed on the fluid end and/or the power end.

17. The pump of claim 1, wherein the one or more strain gauge comprises a plurality of strain gauges, with a first strain gauge disposed on the fluid end and a second strain gauge disposed on the power end, and wherein offset between the first strain gauge and the second strain gauge is monitored by the control system.

18. The pump of claim 1, wherein the pump is one of a plurality of similar pumps which are configured to jointly pump fluid downhole in the well, wherein the control system is configured to compare strain data from the plurality of pumps and to initiate action only in the event that strain data of one of the plurality of pumps is more than a pre-set percentage from a mean of the plurality of pumps.

19. A pump configured to introduce treatment fluid into a well, comprising:
a power end;
a fluid end having a fluid end housing with a chamber, a suction valve, and a discharge valve;
an expandable bellows in fluid communication with the power end;
one or more strain gauge configured to measure strain in the pump; and
a control system configured to receive data from the one or more strain gauge and to monitor for valve health, wherein the one or more strain gauge is disposed on the fluid end and/or the power end, the pump further comprising one or more position sensor, wherein the controller is configured to correlate data from the one or more position sensor with data from the one or more strain gauge, wherein the power end comprises a piston disposed in a bore, wherein the one or more position sensor comprises two position sensors, wherein a first of the two position sensors is configured to detect position of the bellows and a second of the two position sensors is configured to detect position of the piston, and wherein a difference between position of the bellows and position of the piston is monitored by the control system using data from the two position sensors to determine whether the bellows is in sync with the piston.

* * * * *